(12) United States Patent
Held et al.

(10) Patent No.: US 10,883,898 B2
(45) Date of Patent: Jan. 5, 2021

(54) APPARATUS FOR CHECKING TYRES

(71) Applicant: PIRELLI TYRE S.P.A., Milan (IT)

(72) Inventors: Alessandro Held, Milan (IT); Riccardo Antoj, Milan (IT); Maurizio Marchini, Milan (IT); Valeriano Ballardini, Imola (IT); Giuseppe Casadio Tozzi, Imola (IT)

(73) Assignee: PIRELLI TYRE S.P.A., Milan (IT)

( * ) Notice: Subject to any disclaimer, the term of this patent is extended or adjusted under 35 U.S.C. 154(b) by 113 days.

(21) Appl. No.: 16/064,982

(22) PCT Filed: Dec. 28, 2016

(86) PCT No.: PCT/IB2016/058036
§ 371 (c)(1),
(2) Date: Jun. 21, 2018

(87) PCT Pub. No.: WO2017/141094
PCT Pub. Date: Aug. 24, 2017

(65) Prior Publication Data
US 2018/0372592 A1    Dec. 27, 2018

(30) Foreign Application Priority Data

Dec. 28, 2015  (IT) .............................. UB2015A9603

(51) Int. Cl.
*G01M 17/02* (2006.01)
*G01N 21/95* (2006.01)
*G01N 21/954* (2006.01)

(52) U.S. Cl.
CPC .......... *G01M 17/027* (2013.01); *G01M 17/02* (2013.01); *G01N 21/954* (2013.01); *G01N 21/9515* (2013.01)

(58) Field of Classification Search
CPC .. G01M 17/02; G01M 17/021; G01M 17/022; G01M 17/027; G01M 17/025;
(Continued)

(56) References Cited

U.S. PATENT DOCUMENTS 3,722,270 A * 3/1973 Sperberg ............. B29C 35/0288
                                                        73/146
4,506,981 A    3/1985 Hoff, Jr.
(Continued)

FOREIGN PATENT DOCUMENTS

CN      1624420 A    6/2005
CN    101672627 A    3/2010
(Continued)

OTHER PUBLICATIONS

Non-Final Office Action for U.S. Appl. No. 16/066,264, filed Jun. 26, 2018, on behalf of Pirelli Tyre S.P.A. dated Jan. 16, 2019. 8 pages.
(Continued)

*Primary Examiner* — Andre J Allen
(74) *Attorney, Agent, or Firm* — Steinfl + Bruno LLP

(57) ABSTRACT

An apparatus for checking tyres has a support, deformation systems, positioning actuators and a moving member. The deformation systems apply, in operation, compression forces on respective surfaces of a free wall of the tyre to form deformed portions of the free wall. The positioning actuators move the deformation systems towards and away from the surfaces. The moving member sets the tyre in relative rotation with respect to the deformation systems.

21 Claims, 9 Drawing Sheets

(58) Field of Classification Search
CPC ...... G01M 17/024; G01M 17/10; G01M 7/08;
G01M 17/0076; G01M 17/013; G01M
17/03; G01M 17/04; G01M 17/06; G01M
17/08; G01M 1/02; G01M 1/045; G01M
1/12; G01M 1/225; G01M 3/40; G01M
5/0091; G01M 7/02; G01M 99/00; G01M
99/002; B60C 23/0494; B60C 2019/004;
B60C 23/0493; B60C 19/00; B60C 23/04;
B60C 23/0498; B60C 23/064; B60C
23/0488; B60C 23/0496; B60C 23/0408;
B60C 23/041; B60C 23/0411; B60C
23/20; B60C 23/0486; B60C 23/06; B60C
11/243; B60C 11/246; B60C 23/061;
B60C 99/00; B60C 11/0083; B60C
13/003; B60C 2009/2038; B60C 23/00;
B60C 23/003; B60C 23/004; B60C 23/02;
B60C 23/0401; B60C 23/0406; B60C
23/0416; B60C 23/0433; B60C 23/0455;
B60C 23/0459; B60C 23/0474; B60C
23/0489; B60C 23/0491; B60C 25/002;
B60C 25/005; B60C 25/007; B60C 29/02;
B60C 3/04; B60C 99/006; B60C 11/0332;
B60C 11/24; B60C 13/001; B60C 13/02;
B60C 15/0036; B60C 17/02; B60C
2009/0071; B60C 2009/2022; B60C
2200/02; B60C 2200/06; B60C 2200/065;
B60C 23/001; B60C 23/007; B60C
23/008; B60C 23/0413; B60C 23/0427;
B60C 23/0447; B60C 23/0454; B60C
23/0457; B60C 23/0462; B60C 23/0467;
B60C 23/0471; B60C 23/0472; B60C
23/0476; B60C 23/0479; B60C 23/0484;
B60C 23/065; B60C 23/066; B60C 23/10;
B60C 25/0548; B60C 25/056; B60C
25/132; B60C 25/138; B60C 25/18; B60C
29/005; B60C 9/005; B60C 9/18; B60C
9/1807; B60C 9/20; B60C 9/28
USPC .................................................. 73/146–146.8
See application file for complete search history.

(56) References Cited

U.S. PATENT DOCUMENTS

| | | | |
|---|---|---|---|
| 6,327,374 B1 | 12/2001 | Piironen et al. | |
| 6,680,471 B2 | 1/2004 | Kokubu et al. | |
| 6,840,097 B1 | 1/2005 | Huber et al. | |
| 7,187,437 B2 | 3/2007 | Shaw et al. | |
| 7,343,789 B2 | 3/2008 | Fujisawa et al. | |
| 7,421,108 B2 | 9/2008 | Kaneko et al. | |
| 7,466,430 B2 | 12/2008 | Braghiroli | |
| 7,568,385 B2 | 8/2009 | Maehner et al. | |
| 8,284,393 B2 | 10/2012 | Takahashi et al. | |
| 8,618,924 B2 | 12/2013 | Fujisawa | |
| 8,824,878 B2 | 9/2014 | Mizukusa et al. | |
| 9,097,514 B2 | 8/2015 | Takahashi et al. | |
| 9,175,952 B2 | 11/2015 | Mizutani et al. | |
| 9,239,274 B2 | 1/2016 | Joly | |
| 9,719,944 B2 | 8/2017 | Boffa et al. | |
| 10,275,874 B2 | 4/2019 | Ghidotti Piovan et al. | |
| 10,488,302 B2 | 11/2019 | Held et al. | |
| 10,605,698 B2 | 3/2020 | Held et al. | |
| 10,809,158 B2 | 10/2020 | Held et al. | |
| 2001/0024279 A1 | 9/2001 | Kaneko et al. | |
| 2004/0212795 A1 | 10/2004 | Steinbichler et al. | |
| 2005/0052637 A1 | 3/2005 | Shaw et al. | |
| 2005/0052657 A1 | 3/2005 | Braghiroli | |
| 2005/0264796 A1* | 12/2005 | Shaw ................... | G01B 11/162 356/237.2 |
| 2007/0093981 A1* | 4/2007 | Reynolds ............ | G01M 17/022 702/113 |
| 2009/0282905 A1 | 11/2009 | Dengler et al. | |
| 2010/0002244 A1 | 1/2010 | Iino et al. | |
| 2010/0013916 A1 | 1/2010 | Maehner | |
| 2011/0018999 A1 | 1/2011 | Joly et al. | |
| 2011/0188731 A1 | 8/2011 | Sekiguchi | |
| 2011/0288814 A1 | 11/2011 | Mizutani et al. | |
| 2012/0134656 A1 | 5/2012 | Mizukusa et al. | |
| 2013/0093879 A1 | 4/2013 | Bertolotti | |
| 2014/0373614 A1 | 12/2014 | Steinbichler et al. | |
| 2015/0122391 A1 | 5/2015 | Hinque et al. | |
| 2015/0226644 A1 | 8/2015 | Boffa et al. | |
| 2016/0084739 A1 | 3/2016 | Park | |
| 2016/0238488 A1 | 8/2016 | Charlat et al. | |
| 2016/0377556 A1 | 12/2016 | Boffa et al. | |
| 2017/0370807 A1* | 12/2017 | Boffa .................. | G01M 17/027 |
| 2018/0143102 A1* | 5/2018 | Boffa .................. | G01M 17/021 |
| 2018/0299352 A1 | 10/2018 | Rose et al. | |
| 2018/0299353 A1 | 10/2018 | Held et al. | |
| 2018/0328819 A1 | 11/2018 | Boffa et al. | |
| 2018/0364134 A1 | 12/2018 | Held et al. | |
| 2018/0372590 A1* | 12/2018 | Held .................... | G01N 21/9515 |
| 2019/0017902 A1 | 1/2019 | Held et al. | |
| 2019/0086293 A1* | 3/2019 | Held .................... | G01N 21/8806 |
| 2019/0318466 A1 | 10/2019 | Ghidotti Piovan et al. | |
| 2020/0191685 A1 | 6/2020 | Held et al. | |

FOREIGN PATENT DOCUMENTS

| | | |
|---|---|---|
| CN | 102053042 A | 5/2011 |
| CN | 102203578 A | 9/2011 |
| CN | 102313749 A | 1/2012 |
| CN | 102478527 A | 5/2012 |
| CN | 103038601 A | 4/2013 |
| CN | 203011704 U | 6/2013 |
| DE | 4231578 A1 | 3/1994 |
| EP | 1030173 A1 | 8/2000 |
| EP | 1120640 A1 | 8/2001 |
| EP | 2078955 A1 | 7/2009 |
| EP | 2322899 A1 | 5/2011 |
| EP | 3391011 B1 | 2/2020 |
| JP | 2000241362 A | 9/2000 |
| JP | 2005164254 A | 6/2005 |
| JP | 2005315821 A | 11/2005 |
| JP | 2007505313 A | 3/2007 |
| JP | 2008116270 A | 5/2008 |
| JP | 2008203258 A | 9/2008 |
| JP | 2009139268 A | 6/2009 |
| JP | 2010266259 A | 11/2010 |
| JP | 2011038896 A | 2/2011 |
| JP | 2011511932 A | 4/2011 |
| JP | 2013242256 A | 12/2013 |
| JP | 2014074631 A | 4/2014 |
| JP | 5518571 B2 | 6/2014 |
| WO | 01/81886 A2 | 11/2001 |
| WO | 2008/053742 A1 | 5/2008 |
| WO | 2010/024254 A1 | 3/2010 |
| WO | 2015/004587 A1 | 1/2015 |
| WO | 2015/044196 A1 | 4/2015 |
| WO | 2015/079370 A1 | 6/2015 |
| WO | 2017/103814 A1 | 6/2017 |
| WO | 2017/103873 A1 | 6/2017 |
| WO | 2017/115290 A1 | 7/2017 |
| WO | 2017/115300 A1 | 7/2017 |

OTHER PUBLICATIONS

International Search Report for International Application No. PCT/IB2016/058038 filed Dec. 28, 2016 on behalf of Pirelli Tyre S.P.A, dated May 11, 2017. 3 pages.

Written Opinion for International Application No. PCT/IB2016/058038 filed Dec. 26, 2016 on behalf of Pirelli Tyre S.P.A, dated May 11, 2017. 6 pages.

Non-Final Office Action for U.S. Appl. No. 15/780,602, filed May 31, 2018 on behalf of Pirelli Tyre S.P.A, dated Sep. 13, 2019. 15 pages.

(56) References Cited

OTHER PUBLICATIONS

Notice of Allowance for U.S. Appl. No. 16/066,264, filed Jun. 26, 2018 on behalf of Pirelli Tyre S.P.A, dated Aug. 1, 2019. 8 pages.
First Chinese Office Action dated Jan. 7, 2020 by China National Intellectual Property Administration, 19 pages, Chinese Original + English translation.
Japanese Office Action for Japanese Application No. 2018532287, dated Jan. 28, 2020. 8 pages. (Japanese original and English translation).
Notice of Allowance for U.S. Appl. No. 15/776,398, filed May 15, 2018 on behalf of Pirelli Tyre S.P.A, dated Apr. 17, 2020. 10 pages.
Russian Office Action for Russian Application No. 2018124988/28(039605) filed on behalf of Pirelli Tyre SPA, dated Apr. 17, 2020. 17 pages. (Russian + English Translation).
International Search Report and Written Opinion issued for International Patent Application No. PCT/IB2016/058052, filed Dec. 28, 2016 on behalf of Pirelli Tyre S.P.A, dated Jun. 16, 2017. 13 pages.
International Search Report issued for International Patent Application No. PCT/IB2016/057712, filed Dec. 16, 2016 on behalf of Pirelli Tyre S.P.A, dated Mar. 30, 2017. 4 pages.
Written Opinion issued for International Patent Application No. PCT/IB2016/057712, filed Dec. 16, 2016 on behalf of Pirelli Tyre S.P.A, dated Mar. 30, 2017. 6 pages.
International Search Report and Written Opinion issued for International Patent Application No. PCT/IB2016/058036, filed Dec. 28, 2016 on behalf of Pirelli Tyre S.P.A, dated Jul. 21, 2017. 12 pages.
First Office Action for Chinese Application No. 201680070465.1 on behalf of Pirelli Tyre S.P.A, dated Dec. 4, 2019. 14 pages, Chinese Original + English translation.
EPO Communication Office Action for EP Application No. 16836051 filed on behalf of Pirelli Tyre S.P.A, dated Jan. 14, 2020. 4 pages.
EPO Communication pursuant to Article 94(3) EPC for EP Application No. 16836051 filed on behalf of Pirelli Tyre S.P.A, dated Jul. 24, 2019. 6 pages.
Notification of First Office Action for Chinese Application No. 201680081671.2 filed on Dec. 28, 2016 on behalf of Pirelli Tyre S.P.A, dated Sep. 27, 2019. 12 pages, Chinese Original + English translation.
International Search Report for PCT/IB2016/057620 filed on Dec. 15, 2016 on behalf of Pirelli Tyre S.P.A, dated Mar. 23, 2017. 3 pages.
Non-Final Office Action for U.S. Appl. No. 15/776,398, filed May 15, 2018 on behalf of Pirelli Tyre S.P.A, dated Dec. 19, 2019. 10 pages.
Non-Final Office Action for U.S. Appl. No. 16/064,448, filed Jun. 20, 2018 on behalf of Pirelli Tyre S.P.A, dated Jan. 23, 2020. 16 pages.
Notice of Allowance for U.S. Appl. No. 15/780,602, filed May 31, 2018 on behalf of Pirelli Tyre S.P.A, dated Nov. 20, 2019. 8 pages.
Written Opinion for PCT/IB2016/057620 filed on Dec. 15, 2016 on behalf of Pirelli Tyre S.P.A, dated Mar. 23, 2017. 6 pages.
Communication pursuant to Article 94(3) EPC issued for EP Application No. 16826457 filed Dec. 16, 2016, on behalf of Pirelli Tyre S.P.A. dated Apr. 3, 2019. 7 Pages.
Japanese Notice of Allowance for JP Application No. 2018-526768 filed Dec. 16, 2016, on behalf of Pirelli Tyre S.P.A. dated Oct. 8, 2020. Japanese Original + Machine Trans. 7 Pages.
Non-Final Office Action for U.S. Appl. No. 16/796,789 filed Feb. 20, 2020 on behalf of Pirelli Tyre S.P.A. dated Sep. 11, 2020. 16 Pages.
Russian Decision to Grant for RU Application No. 2018124988 filed Dec. 16, 2016 on behalf of Pirelli Tyre SPA. dated Aug. 10, 2020. Russian + English Trans. 24 Pages.

\* cited by examiner

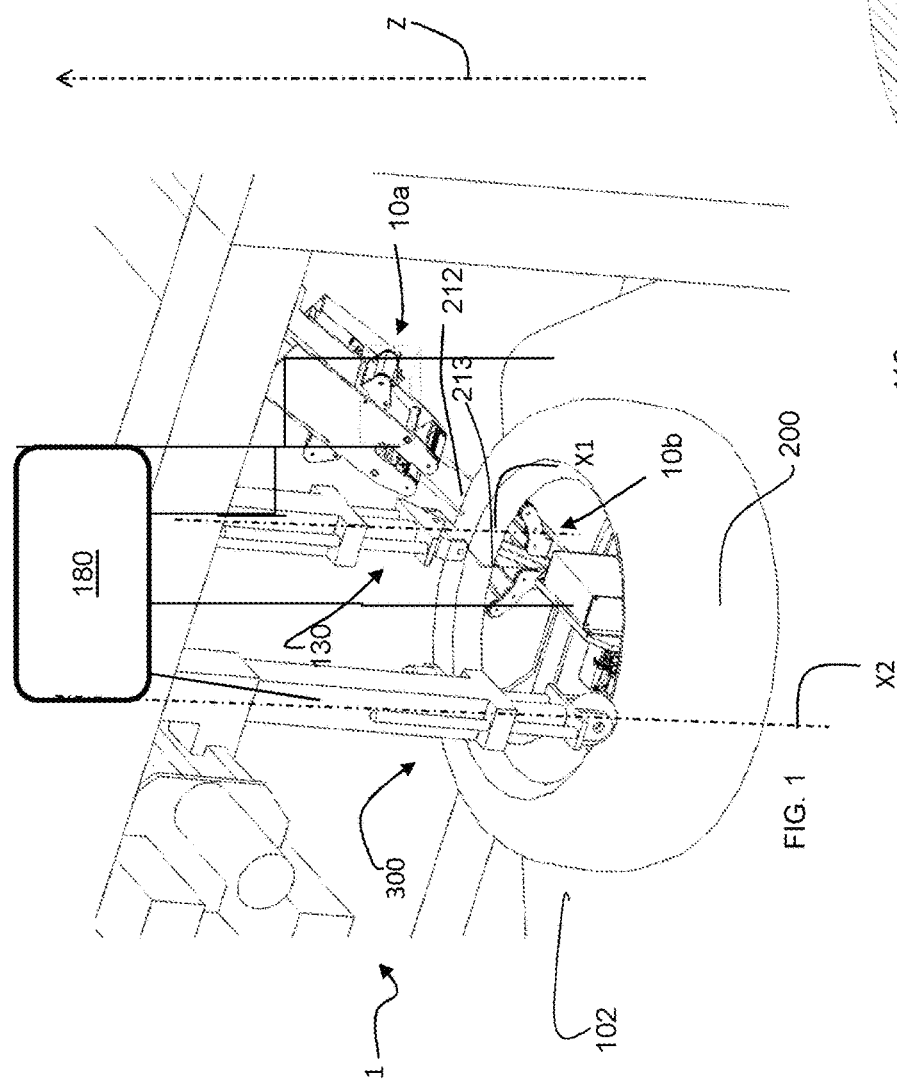
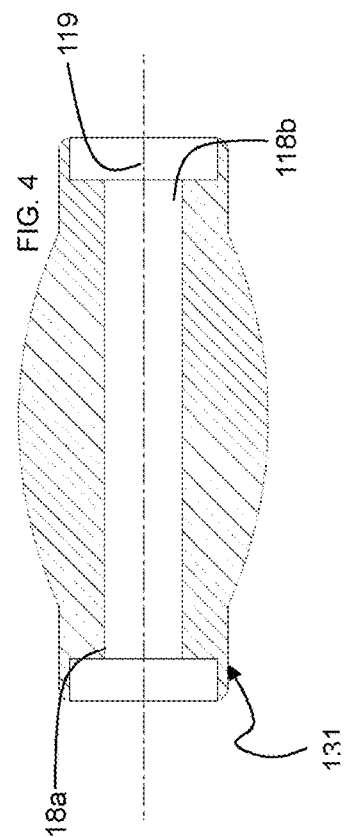

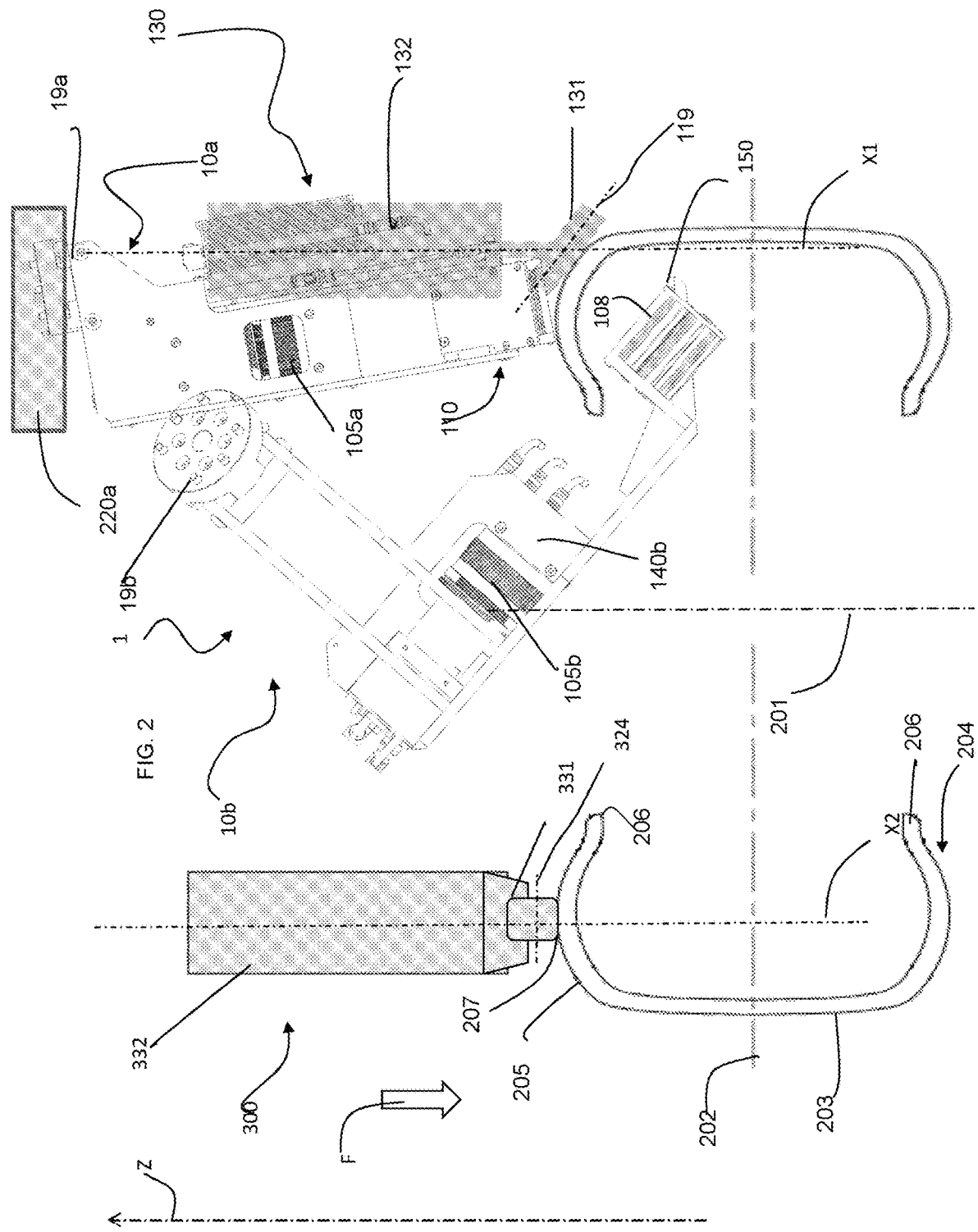

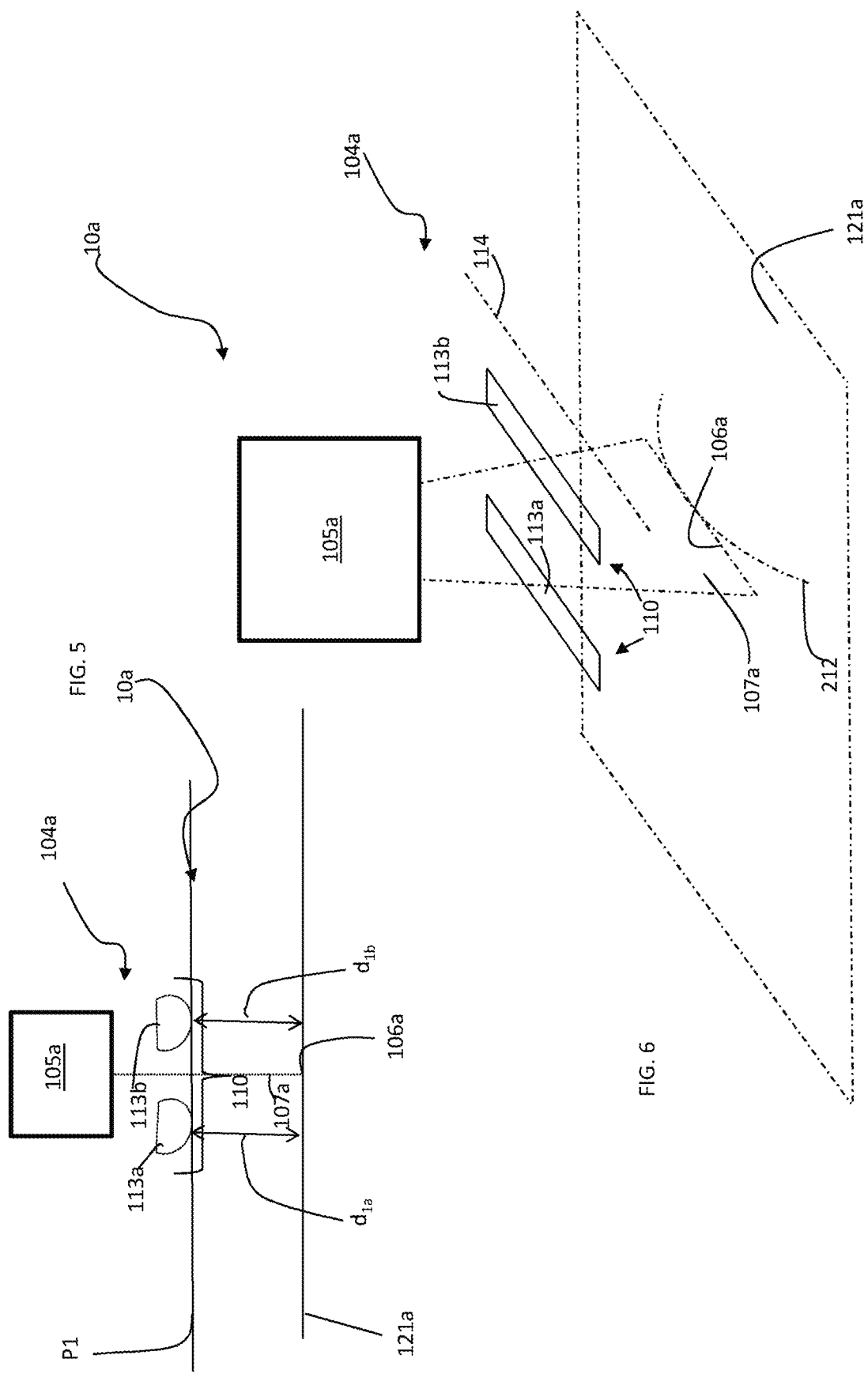

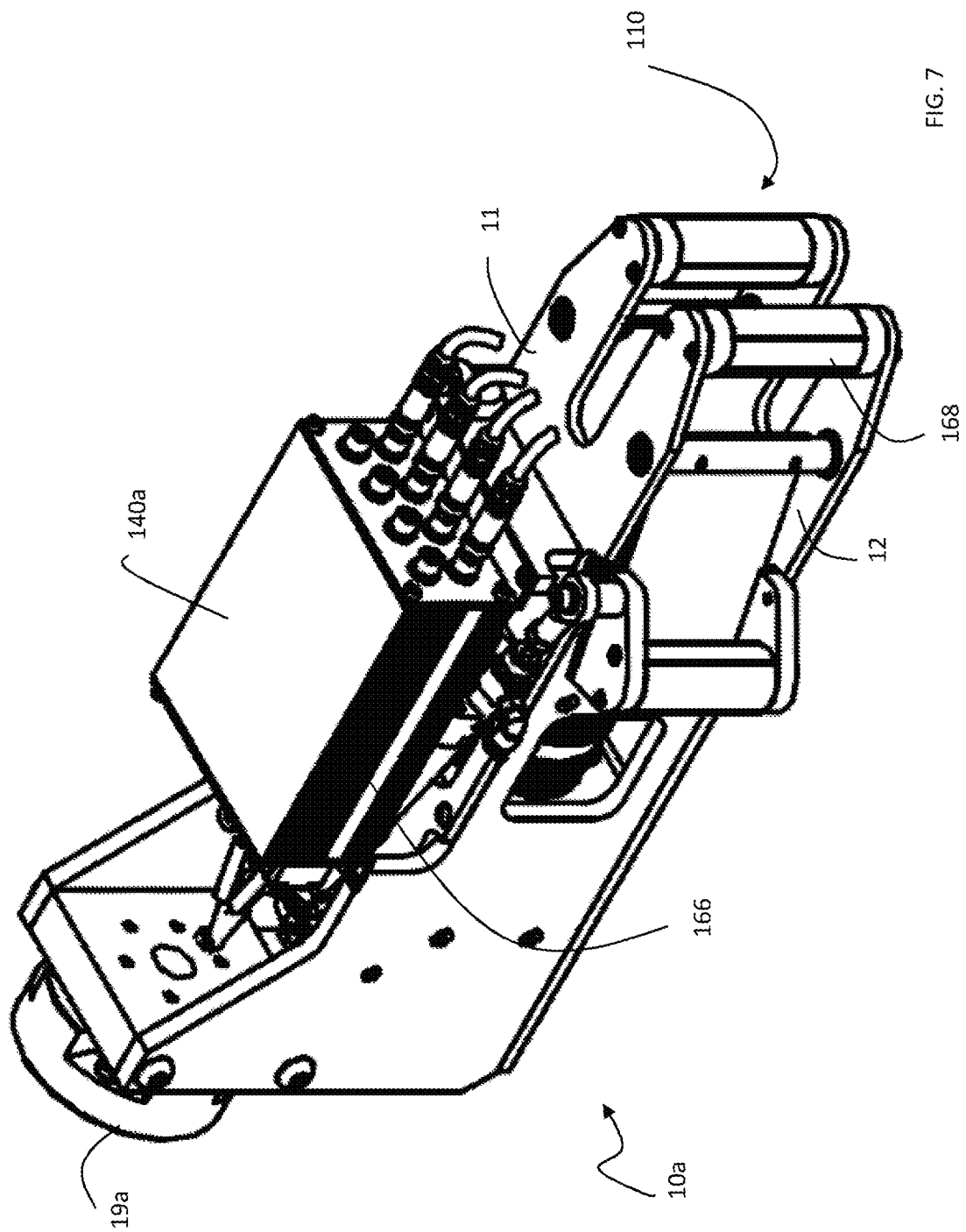

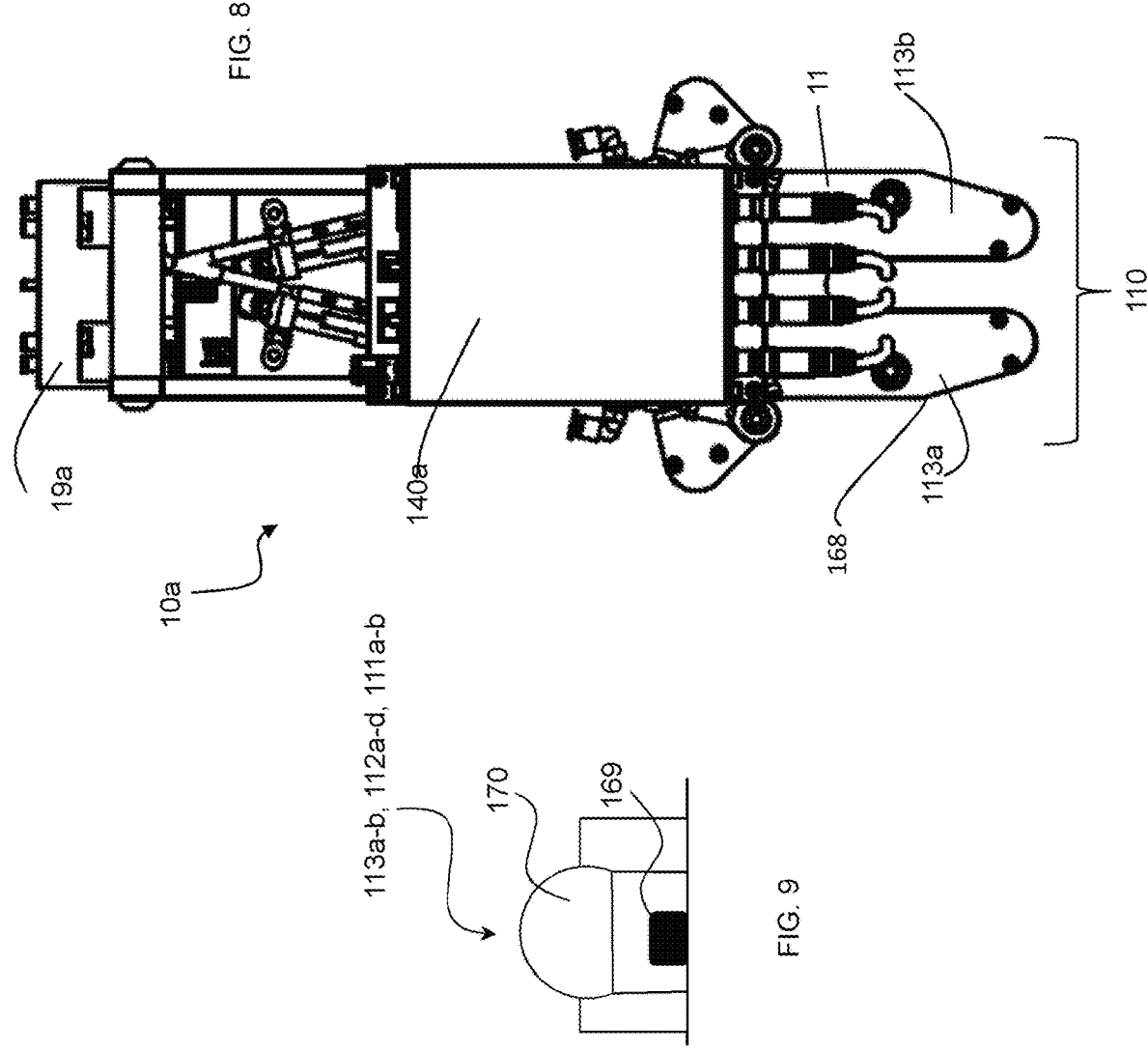

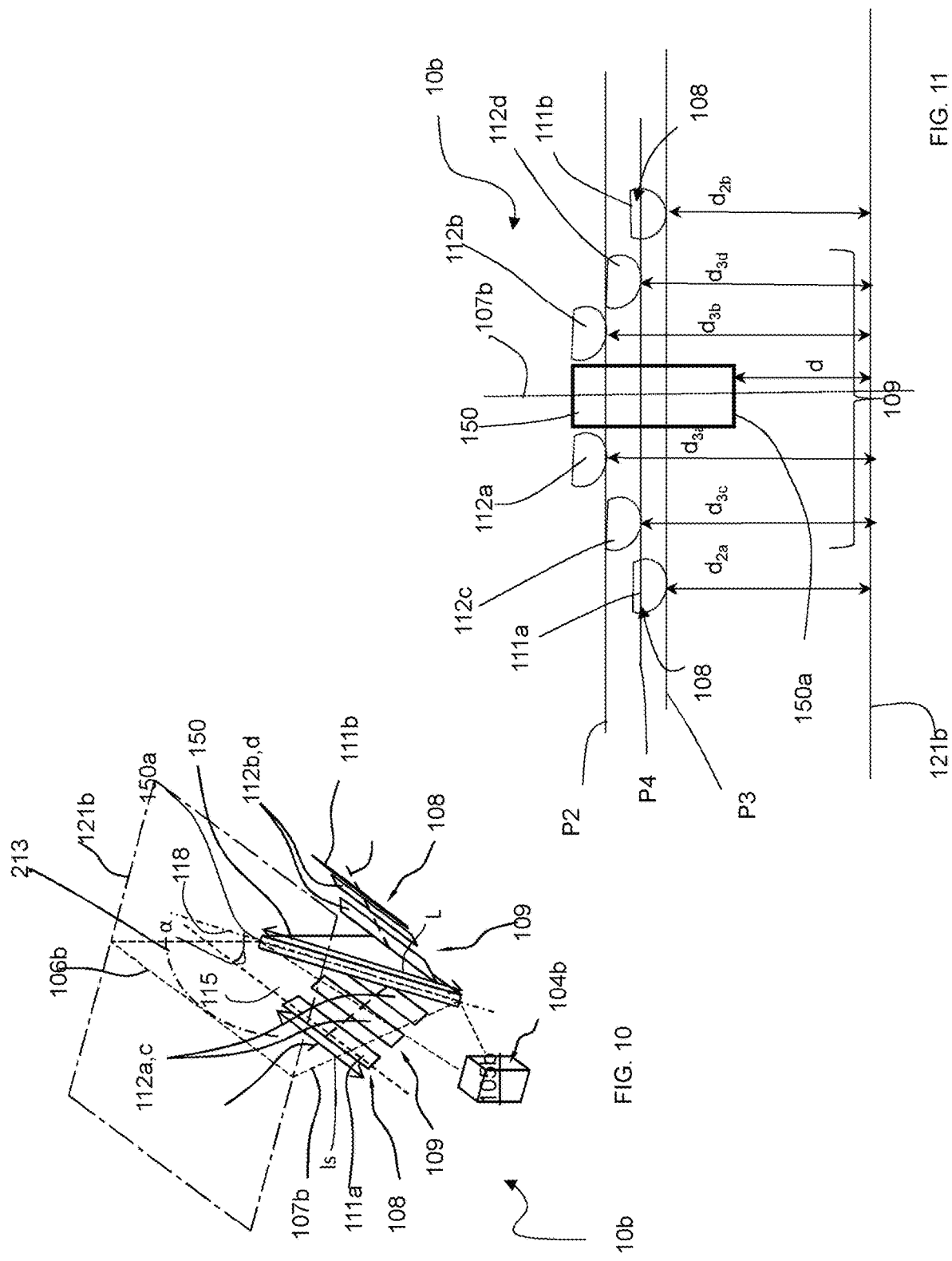

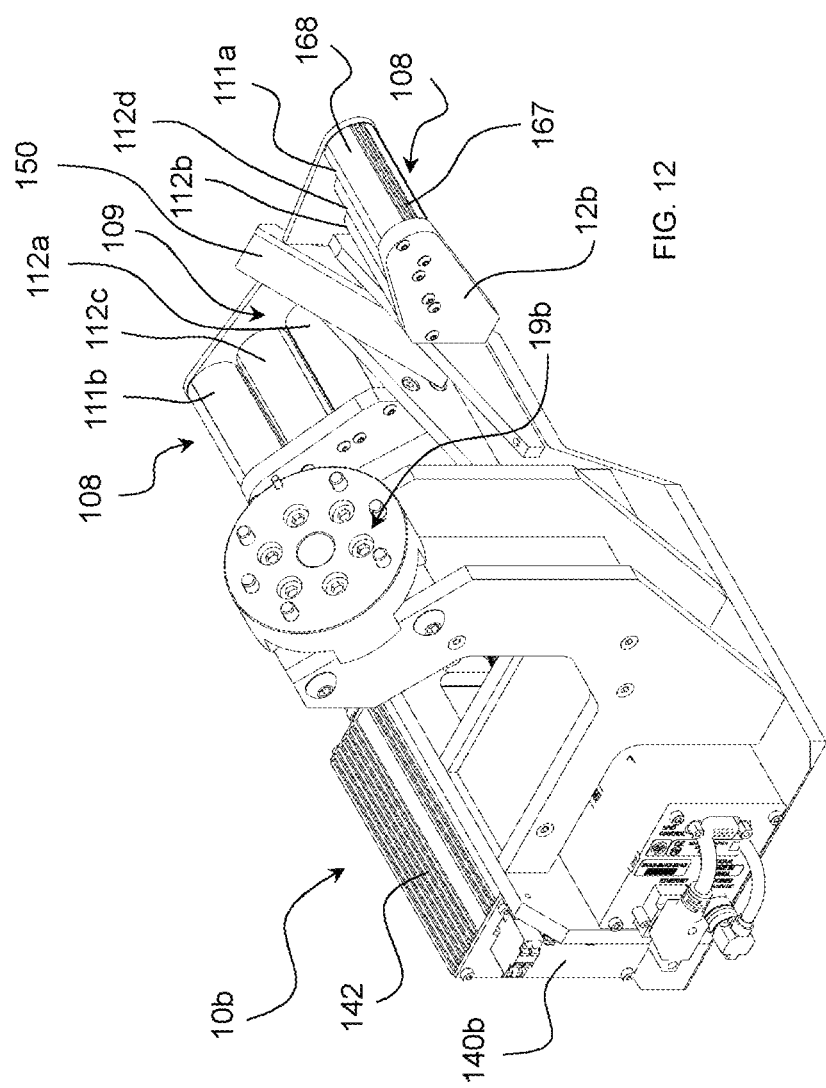

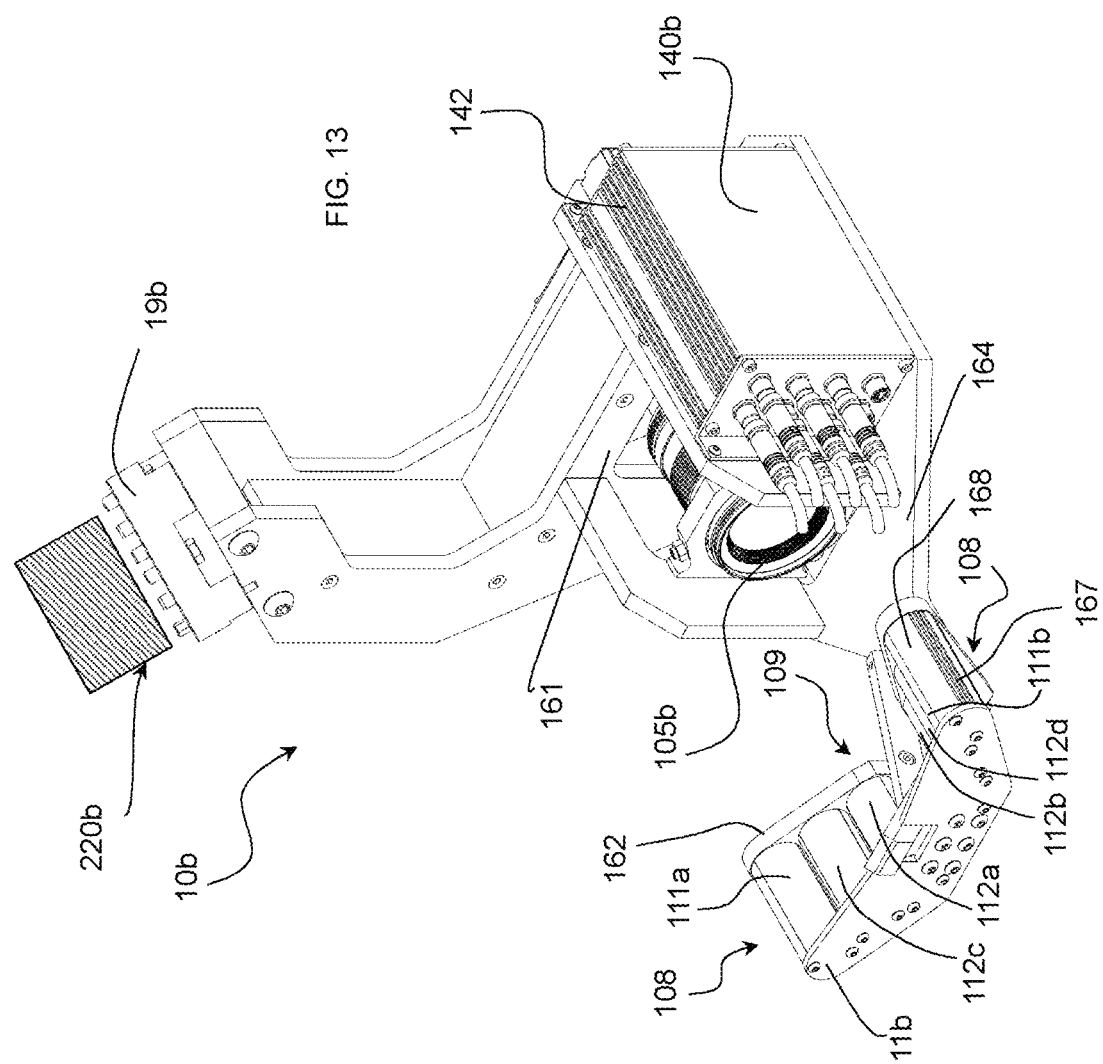

APPARATUS FOR CHECKING TYRES

CROSS REFERENCE TO RELATED APPLICATIONS

The present application is the U.S. National Stage of International Patent Application No. PCT/IB2016/058036 filed on Dec. 28, 2016 which, in turn, claims priority to Italian Application No. UB2015A009603 filed on Dec. 28, 2015.

FIELD

The present invention concerns an apparatus for checking tyres, for example in a tyre production line, in particular an apparatus for checking for the possible presence of defects on, or close to, the surface of a tyre, whether inner or outer, more preferably close to the walls of a tyre.

BACKGROUND

Typically, a tyre has a substantially toroidal structure about a rotation axis thereof during operation, and has an axial mid-plane perpendicular to the rotation axis, said plane typically being a plane of substantial geometric symmetry, e.g. ignoring possible minor asymmetries, such as the tread pattern and/or the internal structure.

Two portions of the tyre are identified here: the crown and the walls. The crown comprises the tread band, the belt and the corresponding portion of carcass structure inside them.

The term "wall" is meant to indicate one of the two portions of the tyre facing one another and that extend radially on opposite sides of the crown up to the beads, i.e. up to the two radially inner end edges of the tyre, having circular extension substantially perpendicular to the rotation axis; said beads being intended to each couple with a respective mounting rim. Each wall thus comprises a corresponding portion of carcass structure and, in a position axially outside of it, a portion made of suitable elastomeric material, generally called 'sidewall'.

Typically, the carcass structure comprises at least one carcass ply having respectively opposite end edges engaged with respective annular reinforcing structures, generally called "bead cores", integrated in the areas identified above with the name beads. In "tubeless" tyres, the carcass ply is entirely coated with a layer of elastomeric material preferably butyl-based, usually called "liner" having excellent characteristics of impermeability to air and extending from one bead to another.

The structure of a wall is also meant to entirely include the so-called "shoulder", i.e. the portion of the tyre for joining between the crown and the radially inner portion of the wall (in other words, the two shoulders correspond to the two radially and axially outer circular 'edges' of the tyre). The shoulder has circular extension substantially perpendicular to the rotation axis.

The term "tyre" is meant to indicate the finished tyre, i.e. after the moulding and vulcanisation steps following the building step.

The terms outer or inner surface of the tyre, are respectively meant to indicate the surface that remains visible after the coupling of the tyre with its mounting rim and that which is no longer visible after said coupling.

The terms "optical", "light" and similar refer to an electromagnetic radiation used that has at least one portion of the spectrum falling within a widened range of the optical band, and not necessarily falling strictly within the optical band (in other words 400-700 nm), for example such a widened range of the optical band can extend from ultraviolet to infrared (for example wavelengths comprised between about 100 nm and about 1 μm).

In the present application a ray model of light radiation is adopted, i.e. it is presumed that light radiation incident on a point of a surface and generated by a non-pointed light source (in which case there would be a single ray) corresponds to a set of light rays incident on the point and having rectilinear propagation direction that connects each point of the light source with said point of the surface, where each of such rays has an associated fraction of the total light power incident on the point.

The term "directional light radiation" incident at a point of a surface is meant to indicate light radiation for which there is a solid angle having the point as vertex and amplitude less than or equal to $\pi/8$ steradians in which at least 75% of the total light power, preferably at least 90%, more preferably the entire light power falls.

The term "diffused light radiation" is meant to indicate a non-directional light radiation.

The term "grazing light radiation" incident at a point of a surface is meant to indicate a light radiation in which at least 75% of the total light power thereof incident on the point of the surface forms an angle of incidence less than or equal to 60° with a plane tangent to the surface at each said point.

The term "image" or synonymously "digital image" is meant to indicate in general a dataset, typically contained in a computer file, in which each coordinate (typically two-dimensional) of a finite set (typically two-dimensional and of the matrix type, i.e. N rows×M columns) of spatial coordinates (each typically corresponding to a pixel) is associated with a corresponding set of numeric values (which can be representative of magnitudes of a different type). For example, in monochromatic images (like those on the 'grayscale') such as set of values coincides with a single value in a finite scale (typically with 256 levels or tones), such a value for example being representative of the level of luminosity (or intensity) of the respective spatial coordinate when visualised, whereas in colour images the set of values represents the level of luminosity of multiple colours, or channels, typically the primary colours (for example in the RGB colour model red, green and blue, whereas in the CMYK colour model cyan, magenta, yellow and black). The term 'image' does not necessarily imply the actual visualisation thereof.

Every reference to a specific "digital image" (for example to a two-dimensional digital image initially acquired on the tyre) more generally covers any digital image that can be obtained through one or more digital processing operations of said specific digital image (like for example filtering, equalisation, "thresholding", morphological transformations—"opening", etc.,—gradient calculations, "smoothing", etc.).

The term "two-dimensional image" is meant to indicate a digital image each pixel of which has an associated piece of information representative of the reflectivity/diffusivity and/or of the colour of the surface, such as the images detected by common digital cameras.

The term "linear surface portion" is meant to indicate a surface portion having one dimension much larger than the other dimension perpendicular to it, typically greater by at least two orders of magnitude. The smaller dimension of the linear surface portion is typically smaller than or equal to 0.1 mm.

The term "linear image" is meant to indicate a digital image having a much greater number of columns of pixels than the number of rows, typically greater by at least two orders of magnitude. Typically, the number of rows is between 1 and 4 and the number of columns is more than 1000. The term "rows" and "columns" are used conventionally and are interchangeable.

The term "cycle time" within a production line comprising at least one work station, preferably a plurality of work stations, and inserted in a plant for producing tyres is meant to indicate, under normal operating conditions, the maximum transit time for a tyre being manufactured to pass through a work station in which at least one portion of a component of the tyre itself is built. For example, the cycle time can be comprised between about 20 and about 120 seconds.

In processes for producing and building tyres for vehicle wheels it is suitable to carry out quality controls on the products made, with the purpose of avoiding tyres that are defective or in any case outside of the design specifications from being able to be released onto the market, and/or of progressively adjusting the apparatuses and machinery used, so as to improve and optimise the performance of the operations carried out in the production process.

Such quality controls include for example those carried out by human operators who spend a predetermined time period, for example comprised between 30 s and 60 s, carrying out a visual and tactile examination of the tyre; if, in light of his/her experience and sensitivity, the operator suspects that the tyre does not meet certain quality standards, the tyre itself is subjected to further checks, through a more detailed human check and/or suitable apparatuses, in order to more deeply evaluate possible structural and/or quality deficiencies.

US 2012/0134656 shows a lighting device and an inspection device of a tyre, which can easily detect anomalies in the shape of the tyre. A photographic portions photographs a portion of the inner surface of the tyre, whereas an actuator portion rotates the tyre and an inspection portion in a relative manner about an axis of the tyre, in a state of irradiation of light from a light source unit arranged along the inner surface of the tyre towards the circumferential direction of the tyre.

WO 2015/004587 to the same Applicant shows a method and relative apparatus, for checking tyres in a production line, comprising: providing a tyre to be checked; elastically deforming a portion of outer wall of the tyre through a compression force on an outer contact surface of the portion of outer wall, the compression force having an axial direction and going towards the plane of the middle line; illuminating an inner and/or outer surface of the portion of outer wall and detecting an image of the surface illuminated; generating a control signal representative of the image detected; and analysing the control signal in order to detect the possible presence of defects on the portion of outer wall.

WO 2015/004587 to the same Applicant shows a method and relative apparatus for checking tyres in a production line, comprising: providing a tyre to be checked; elastically deforming an outer wall portion of the tyre through a compression force on an outer contact surface of the outer wall portion, the compression force being in the axial direction and directed towards the plane of the middle line; illuminating an inner and/or outer surface of the outer wall portion and detecting an image of the surface illuminated; generating a control signal representative of the image detected; and analysing the control signal in order to detect the possible presence of defects on the outer wall portion.

WO 2015/0079370 to the same Applicant shows a method and relative apparatus for checking tyres comprising a resting plane configured to receive a tyre with axial midplane parallel to the resting plane, defining a resting side portion and a free side portion arranged at a certain height with respect to the resting plane. A thrusting element is configured to apply a force directed towards the resting plane to a measurement surface of the free side portion. A positioning actuator is operatively associated with the thrusting element and configured to move the thrusting element with at least one motion component perpendicular to a rotation axis of the tyre. The apparatus also comprises devices for changing the angular position of the measurement surface. A control unit is programmed to detect a first value of output data at each position of the measurement surface as a function of a first value of input data kept substantially constant along at least one complete rotation of the measurement surface around the rotation axis and to detect a second value of the output data at every position of the measurement surface. The second value of the output data corresponds to a second value of the input data kept substantially constant along at least one complete rotation of the measurement surface. The control unit comprises a module programmed to calculate a difference between the second value of the output data and the first value of the output data at every position of the measurement surface.

SUMMARY

In the field of the checking of tyres, the Applicant has set itself the problem of analysing the surface, inner and/or outer, of the tyre, through optical image acquisition, for example digital, thereof and their subsequent processing, for example in order to detect the possible presence of visible defects on the surface, minimising the checking by human operators. The defects sought can for example be irregularities on the surface of a tyre (unvulcanised compound, alterations in shape, etc.), structural unevenness, cuts, presence of foreign bodies on the surface, etc. Among structural unevenness defects, so-called "carcass cuts" are particularly critical, which are rare but potentially very dangerous defects, generated in the interface region between two portions of the tyre having different chemical-physical characteristics (for example different compounds). Such defects are in the form of small cuts (typically extending longitudinally, i.e. they follow the circular extension of the tyre) characterised by perfectly matching edges between which there is no removal or lack of material, this being a characteristic that makes them particularly difficult to identify. The carcass cuts can also involve structures of the carcass arranged close to the surface of the tyre, for example close to the inner surface, under the layer of liner typically present. In this case typically the liner itself is involved in the cuts, also having a laceration at the carcass cuts and thus making it possible to identify it through optical inspection.

The Applicant has also noted that the illumination, for the same light source, is influenced by the geometry of the object illuminated: on non-flat surfaces, like those of the wall of the tyre, it is difficult to obtain homogeneous illumination over the entire surface and it is necessary to find a compromise situation between the different areas, in order to minimise the overexposed and/or underexposed areas. Such difficulty is accentuated in the illumination of the inner surface of the wall for checking the carcass.

The Applicant has observed that by suitably deforming a portion of wall of a tyre to be checked it is possible to flatten the surface of at least one sub-portion of the deformed portion thus increasing the field depth and improving the illumination conditions for the detection of images, becoming more uniform. By suitably deforming a portion of wall of a tyre to be checked it is possible to decrease the outer radius of curvature of the deformed portion, thus highlighting possible defects, in particular carcass cuts and other cuts or holes, since the accentuation of the normal outer convexity tends to "open" the edges or perimeters of such defects, making them easier to identify in the subsequent image processing. Such an effect can also be obtained on the inner concave surface, by flattening.

A further defect that it is important to identify is the so-called "weak sidewall", i.e. it is preferable to arrange a check aimed at discarding tyres in which the wall has portions with low rigidity, indeed called "weak sidewall", by sidewall meaning an axially outer portion of the finished tyre. The Applicant has observed that such a defect can be detected by acting on the portion of free wall through a compression or deformation force in order to detect variations in the compression or deformation possibly indicating a different rigidity.

The Applicant has also observed that in order for the check for detecting these different types of defects to be able to be used "on line" within a tyre production plant, it is necessary for the check itself to be carried out in shorter time periods and with low costs.

Therefore, the apparatus for checking the tyre through acquisition and analysis of images thereof to highlight possible defects or of a signal relative to variations of the deformation of the sidewall preferably takes, for such a check, a time period that stays within the aforementioned limited "cycle time" period and at the same time ensures an accurate verification of the presence of defects in the tyre itself, at reasonably low cost.

The Applicant has therefore observed that a way of completing a total check of the tyre in a short time is to look for different defects "in parallel", i.e. in the same time period it is advantageous to foresee more than one device each to identify a defect. However, the provision of more than one device in parallel increases the complexity of the tyre production line in its part relative to the check. Furthermore, the provision of "compressions" or "deformations" of different portions of tyre by many devices could cause undesired interference between a compression carried out through one device and a compression carried out through a distinct device, i.e. the compression in a portion of tyre observed could be due to two force components coming from distinct devices and therefore falsify the result of the check. Furthermore, the presence of many compression devices can cause a physical interaction in the movement of the devices themselves with consequent damage.

The Applicant has set itself the problem of devising an apparatus for checking tyres capable of acquiring images of the surface of a tyre, in conditions of deformation, in particular for the simultaneous detection of more than one type of defect on the wall of the tyre, which is suitable for application on line within a tyre production line of a production plant, in other words suitable for being used to obtain low costs and operating times, and capable of providing reliable results.

The Applicant has perceived that having an apparatus including a first deformation system adapted for deforming a first portion of tyre and a second deformation system adapted for deforming a second portion of tyre, both of the systems being able to move towards or away from a wall of the tyre along a direction having at least one component along a first axis and a second axis parallel to a rotation axis of the tyre, positioning the two axes at a certain mutual angle, makes it possible to simultaneously deform a first portion and a second portion of tyre wall, in the most suitable way according to the type of defect that it is wished to identify, and to avoid interference between the two deformations as well as possible toppling of the tyre caused by an excessive force applied substantially in a single relatively small portion of the tyre.

More precisely, the Applicant has finally found that a geometric arrangement such that a first plane passing through said rotation axis of said tyre and said first axis and a second plane passing through said rotation axis of said tyre and said second axis, form an angle between them comprised between about 90° and about 180°, makes it possible to carry out a measurement at the first deformed portion and a measurement at the second deformed portion in parallel, i.e. in the same time period accurately. The correct arrangement of the checking systems makes it possible to check the tyre without damaging said deformation systems and without toppling the same tyre. Moreover, the relative distance between the two deformation systems allows their safe movement minimising the risks of accidental collisions.

According to an aspect, the invention relates to an apparatus for checking tyres. Preferably, a support is provided on which said tyre is adapted for resting, a resting wall and a free wall being thus defined in said tyre, arranged at a certain height with respect to said support.

Preferably, a first deformation system configured to apply, through physical contact, a compression force on a surface of a first portion of said free wall, in order to elastically deform it so as to form a first deformed portion of free wall.

Preferably, a first positioning actuator is provided operatively associated with said first deformation system and configured to move said first deformation system towards and away from said surface of said first portion of free wall of said tyre, said movement having at least one component along a first axis parallel to a rotation axis of said tyre.

Preferably, a second deformation system is provided configured to apply, through physical contact, a compression force on a surface of a second portion of said free wall, in order to elastically deform it so as to form a second deformed portion of free wall.

Preferably, a second positioning actuator is provided operatively associated with said second deformation system and configured to move said second deformation system towards and away from said surface of said second portion of free wall of said tyre, said movement having at least one component along a second axis parallel to said rotation axis of said tyre.

Preferably, a moving member is provided for setting said tyre in relative rotation around said rotation axis with respect to said first deformation system and to said second deformation system.

Preferably, it is foreseen that a first plane passing through said rotation axis of said tyre and said first axis and a second plane passing through said rotation axis of said tyre and said second axis, form an angle between them comprised between about 90° and about 180°.

The Applicant considers that for the purposes of detecting defects in many portions of a surface of a wall of a tyre through the formation of at least two deformed portions, it is particularly advantageous to make an apparatus that makes it possible to generate these two deformed portions so that they form an angle between them, with respect to the rotation axis of the tyre taken as centre, comprised between about 90° and about 180°. These two deformed portions thus arranged are obtained through a first deformation system and a second deformation system able to move towards and away from the tyre. In particular, a surface of a first deformed portion and a surface of a second deformed portion of wall of the tyre are obtained, through a movement along a direction that has at least one component along an axis parallel to the rotation axis of the tyre. In this way, a first axis and a second axis are defined, both parallel to the rotation axis of the tyre, which form an angle comprised between about 90° and about 180° between them, again considering the rotation axis of the tyre as centre of rotation. With this relatively wide angle between the two deformed portions on the wall of the tyre, the risk of interaction between the two deformations is minimised, in other words the first portion deformed by the first deformation system is not influenced, for example further deformed, by the deformation carried out by the second deformation system. In particular, therefore, the first deformed portion is substantially totally separate from the second deformed portion of wall of the tyre. Therefore, two correct measurements, for example one through images acquired of the first deformed portion and one through detection of variations of height or force applied to the second deformed portion, can be obtained quickly since they are obtained in the same time period. Moreover, thanks to the correct positioning of the deformed portions inside the aforementioned angle range of portion of wall of the tyre, risks of toppling thereof are minimised.

The present invention can also have one or more of the preferred characteristics that are described hereinafter.

Preferably, a first light source adapted for emitting a light radiation to illuminate said surface of said first deformed portion and a first camera adapted for detecting an image of said surface of said first deformed portion and for generating at least one signal representative of the image detected are provided.

The first deformed portion highlights a first type of defect, for example cuts on the surface of the tyre that thanks to the compression are "opened" and thus made more visible. This type of defect thus highlighted can be detected by acquiring an image of the surface, for example illuminating it and, preferably, during the illumination acquiring an image of the deformed and illuminated portion of surface through a camera.

Preferably, the image is a digital image.

More preferably, the image is a two-dimensional image.

Even more preferably it is a linear image. The Applicant has observed that this type of defect is more visible and thus detectable on two-dimensional images acquired during an illumination of the surface to be checked.

Preferably, a first robotised arm is provided adapted for moving said first light source and said first camera.

A robotised arm allows an accurate positioning substantially in any position in three-dimensional space of the camera and of the light source so as to acquire images of the surface of the first portion of wall of the tyre in any position thereof.

Preferably, said first positioning actuator is adapted for driving said first deformation system so that said first deformation system applies a substantially constant force against said surface of said first portion of free wall or positions said surface of said first portion of free wall at a substantially constant height with respect to said support.

For the detection of defects in images acquired of the surface of the first deformed portion, acquiring images at substantially constant height makes the comparison of the images with each other simpler, since they are acquired in the same "Z" coordinate, i.e. height, by the support. However, applying a substantially constant force is simpler from the point of view of construction of the compression system, therefore according to the type of check one of the two possibilities is selected.

Preferably, said second positioning actuator is adapted for driving said second deformation system so that said second deformation system applies a substantially constant force against said surface of said second portion of free wall or positions said second portion of free wall at a substantially constant height with respect to said support.

Preferably, said moving member is adapted for modifying the angular position of the surface of said first portion of free wall and said surface of said second portion of said free wall with respect to the rotation axis of the tyre and said apparatus includes a processing unit programmed to detect a value of output data at every angular position of the surface of said second portion of free wall as a function of a value of input data kept substantially constant along at least one complete rotation of the surface of the second portion of free wall around said rotation axis.

Preferably, said output data corresponds to said force in the case in which said input data is the height of the surface of the second portion of free wall of said tyre at every angular position thereof, or to said height in the case in which said input data is the force applied at every position of the surface of the second portion of free wall.

Advantageously, the second deformation system is used for the detection of the so-called "weak sidewall". Also in this case, it is possible to detect this defect either by keeping a substantially constant force and for example measuring the height variations of the surface of the second deformed portion, or by keeping a substantially constant height of the surface of the second deformed portion and measuring the variations in force to keep the same height while the tyre is set in rotation.

More preferably, said processing unit is programmed to detect a first value of output data at every position of the surface of said second portion of free wall as a function of a first value of input data kept substantially constant along at least one complete rotation of the surface of said second portion of free wall around said rotation axis.

Preferably, said output data corresponds to said force in the case in which said input data is the height of the surface of said second portion of free wall at every angular position, or to said height in the case in which said input data is the force applied at every position of the surface of said second portion of free wall.

Even more preferably, said processing unit is programmed to detect a second value of the output data at every position of the surface of said second portion of free wall, said second value of the output data corresponding to a second value of the input data kept substantially constant along at least one complete rotation of the surface of said second portion of free wall around said rotation axis.

Preferably, said processing unit comprises a module programmed to calculate a relationship between said second value of the output data and said first value of the output data at every position of the surface of said second portion of free wall.

The Applicant considers that by arranging the tyre to be checked on a resting plane according to unchanging ways relative to the check to be carried out, and by acting on the second portion of free wall for equal or different time periods with forces of different size, all of the factors that lead to an uncertain repeatability of the checks can be reduced.

The arrangement of the tyre on a resting plane and the application of at least two forces (or movements) of different size for predetermined time periods make it possible to limit the factors that influence the outcomes of the check making it reliable and repeatable with respect to the application of a single force. In particular, the resting plane defines a fixed component capable of carrying out substantially constant reactions to the forces applied and the control unit is programmed to obtain a relationship, preferably a "difference value", unconstrained from each different type of tyre and from the conditions at the perimeter of the measurements of the are always potentially variable. Preferably, said first light source is adapted for emitting a diffused light radiation to illuminate said surface of said first deformed portion, said surface being a surface belonging to a sidewall or to a shoulder of said tyre.

The first deformation system generates a first deformed portion of wall that in turn defines an inner and outer surface of the tyre, delimiting the first deformed portion. As far as the outer surface is concerned, it preferably belongs to the sidewall or to the shoulder of the tyre and preferably only needs diffused light to identify defects. The Applicant has indeed found that the defects able to be detected by compression are localised mainly in the sidewall or in the shoulder of the tyre.

Preferably, a second light source is provided adapted for emitting a light radiation to illuminate a further surface of said first deformed portion and a second camera adapted for detecting at least one further image of said further surface of said first deformed portion and for generating at least one signal representative of the further image detected.

More preferably, this further surface is an inner surface of said tyre. As stated, through the deformation of a first portion of free wall of said tyre, a portion of deformed outer surface and a portion of deformed inner surface are defined.

Preferably, the first light source is adapted for illuminating the portion of deformed outer surface, whereas the second light source is adapted for illuminating the portion of deformed inner surface. In this way, a check of defects in inner and outer surfaces in parallel is possible, reducing the total tyre checking times.

More preferably, a second robotised arm is provided adapted for moving said second light source and said second camera.

Similarly to the first light source and to the first camera, it is preferable to couple the second light source and the second camera with a robotised arm for their correct and accurate movement in space.

More preferably, said second light source is adapted for emitting an grazing light radiation to illuminate said further surface of said first deformed portion, said further surface being a surface belonging to an inner surface corresponding to a sidewall of said tyre.

Preferably, the deformed inner surface, in order to detect the defects thereof, is illuminated through an grazing light radiation.

More preferably, a third light source is provided adapted for emitting a light radiation to illuminate said further surface of said first deformed portion and said second camera being adapted for detecting at least one second further image of said further surface of said first deformed portion and for generating at least one signal representative of the second further image detected.

Preferably, the third light source emits a diffused light radiation on the second portion of surface. The deformed second portion preferably needs an illumination with two different types of grazing and diffused light radiation, and even more preferably with two types of grazing light radiation, for example on opposite sides of an optical plane of the second camera, so as to obtain the acquisition of at least two images, more preferably of three images, for the same second portion of deformed surface, each with different illumination, which can be compared with each other to identify the defects on the second portion of surface.

In order to obtain images of the deformed portion of inner surface with more than one type of illumination, so that images having different illuminations can be compared in order to better detect defects possibly present, it is preferred to illuminate alternately with one or other type of light radiation, both grazing but coming from different half-planes, and acquire an image through the second camera at every illumination. Therefore, preferably there is a synchronisation between the second camera and its acquisition of images and the switching on of the second light source or of the third light source.

Preferably, said first camera defines an optical plane, said first light source illuminating said surface of said first deformed portion symmetrically with respect to said optical plane.

A symmetry in the sources, in this case of the first light source, allows an easier comparison of images detected by the first camera. For example, the symmetry can be obtained by providing a plurality of sub-sources of the first sources arranged at the opposite sides of the optical plane and more preferably the same distance from the optical plane so as to obtain a specularly symmetrical configuration.

Preferably, said second camera defines an optical plane, said second light source illuminating said further surface of said first deformed portion symmetrically with respect to said optical plane.

Advantageously, a symmetrical illumination as stated above allows an easier comparison of the images with each other. Therefore, preferably the second light source comprises many sub-sources arranged symmetrically with respect to the optical plane defined by the camera.

Preferably, a reflective surface is provided associated with said second camera and with said second light source, said reflective surface being adapted for reflecting a target line of said second camera by an angle comprised between about 60° and about 120°.

The advantageous interposition of a reflective element makes it possible to visualise portions of the inner surface of the tyre, not otherwise able to be visualised, for the following reasons. A tyre has a diameter in general much greater than its width and therefore a device adapted for entering at least partially inside a tyre and for detecting defects thereof preferably must maintain a substantial compactness in particular in the extension corresponding to the width of the tyre. Positioning the camera therefore "behind" the light radiation sources so as to directly receive the light reflected by the inner surface of the tyre would make the apparatus unsuitable for examining portions of the inner surface of the tyre, in particular portions relative to the inner surface of the sidewall and of the shoulder, since the extension of camera and sources one behind the other is generally too high. The presence of a reflective element allows a different positioning between light sources and camera so as to obtain a very compact apparatus, in particular in one direction.

More preferably, said reflective element is arranged symmetrically to said optical plane. In this way, a symmetrical reflection is obtained on the camera of the light coming from the illuminated inner surface of the tyre.

Preferably, said reflective surface is arranged between said second light source and said third light source.

Preferably, said first camera is a linear camera.

Preferably, said second camera is a linear camera.

A type of camera for acquiring images is for example a linear camera defining a target line, intersection of the optical plane on a focal plane in which or close to which the deformed surface portion, inner or outer, is preferably arranged, when illuminated. Therefore, linear surface portions are illuminated that can be obtained close to said target line, and, due to the relative rotation of the tyre, they "run" in temporal succession. For example, such a succession of linear portions can be obtained by rotating the tyre about a rotation axis thereof, or by rotating the detection system and the light sources around the tyre. Preferably, at least one complete rotation of 360° is carried out. More preferably, a rotation of more than 360° is carried out to have a correct juxtaposition between the initial and end part (which must match) of the tyre from where the images begin and end being taken.

Preferably, said first deformation system includes a thrusting roller.

More preferably, the thrusting roller is mounted so as to be able to rotate freely about its own axis. Advantageously, the compression takes place through the roller resting against a surface portion of tyre. The roller, being able to rotate, keeps the portion compressed for a rotation of the tyre about its rotation axis, so that the same surface can be checked in any angular position. When the tyre is set in rotation, the position of the roller remains the same, rotating about its axis due to the rotation of the surface of the tyre with which it is in contact.

More preferably, the axis of the thrusting roller lies on a plane passing through a rotation axis of the tyre and through the radial direction of the deformed surface portion. In this way, an optimal compression of the surface of the tyre is carried out.

Preferably, said rotation axis of said thrusting roller can be positioned at a predetermined angle with a rotation axis of said tyre. In this way, it is possible to "follow" the geometric shape of the surface of the tyre in an optimal manner, suitably inclining the rotation axis of the roller, so that a correct pressure is applied and that the latter is not modified by the geometric shape of the tyre.

Preferably, the thrusting roller can be positioned in two distinct positions. In the first, the rotation axis of the roller is substantially perpendicular to the rotation axis of the tyre. In the second, the rotation axis of the roller and the rotation axis of the tyre form an angle of 120°.

Preferably, a processing unit is provided programmed to process said image, so as to detect possible defects in said surface or further surface of said tyre.

BRIEF DESCRIPTION OF THE DRAWINGS

Preferably, a processing unit is provided, programmed to process said further image, so as to detect possible defects in said surface or further surface of said tyre.

Further characteristics and advantages will become clearer from the detailed description of some example, but not exclusive, embodiments of a method and an apparatus for checking tyres, in accordance with the present invention. Such a description will be outlined hereinafter with reference to the attached figures, provided only for indicating and therefore not limiting purposes, in which:

FIG. 1 shows a partial and schematic perspective view of an apparatus for checking tyres in a tyre production line;

FIG. 2 shows a partial and partially sectioned side view of the apparatus for checking tyres in accordance with the present invention of FIG. 1 in an operative step;

FIG. 4 shows a detail of the apparatus of FIG. 3 in enlarged scale;

FIGS. 5 and 6 show a side and perspective view, respectively, of a further detail of the apparatus of FIGS. 1-3 in a schematic manner;

FIG. 7 shows a perspective view of an embodiment of the detail of FIGS. 5 and 6;

FIG. 8 shows a view from above of the embodiment of the detail of FIG. 7;

FIG. 9 shows a schematic side section view of a detail of FIG. 7 or 8;

FIG. 10 shows a partial and schematic perspective view of another further detail of the apparatus of FIG. 2 or 3;

FIG. 11 shows a schematic side view of the detail of FIG. 10;

FIG. 12 shows a perspective view of an embodiment of the detail represented in FIGS. 9 and 10; and FIG. 13 shows a further perspective view of the detail in the embodiment of FIG. 12.

DETAILED DESCRIPTION

Figure 3:
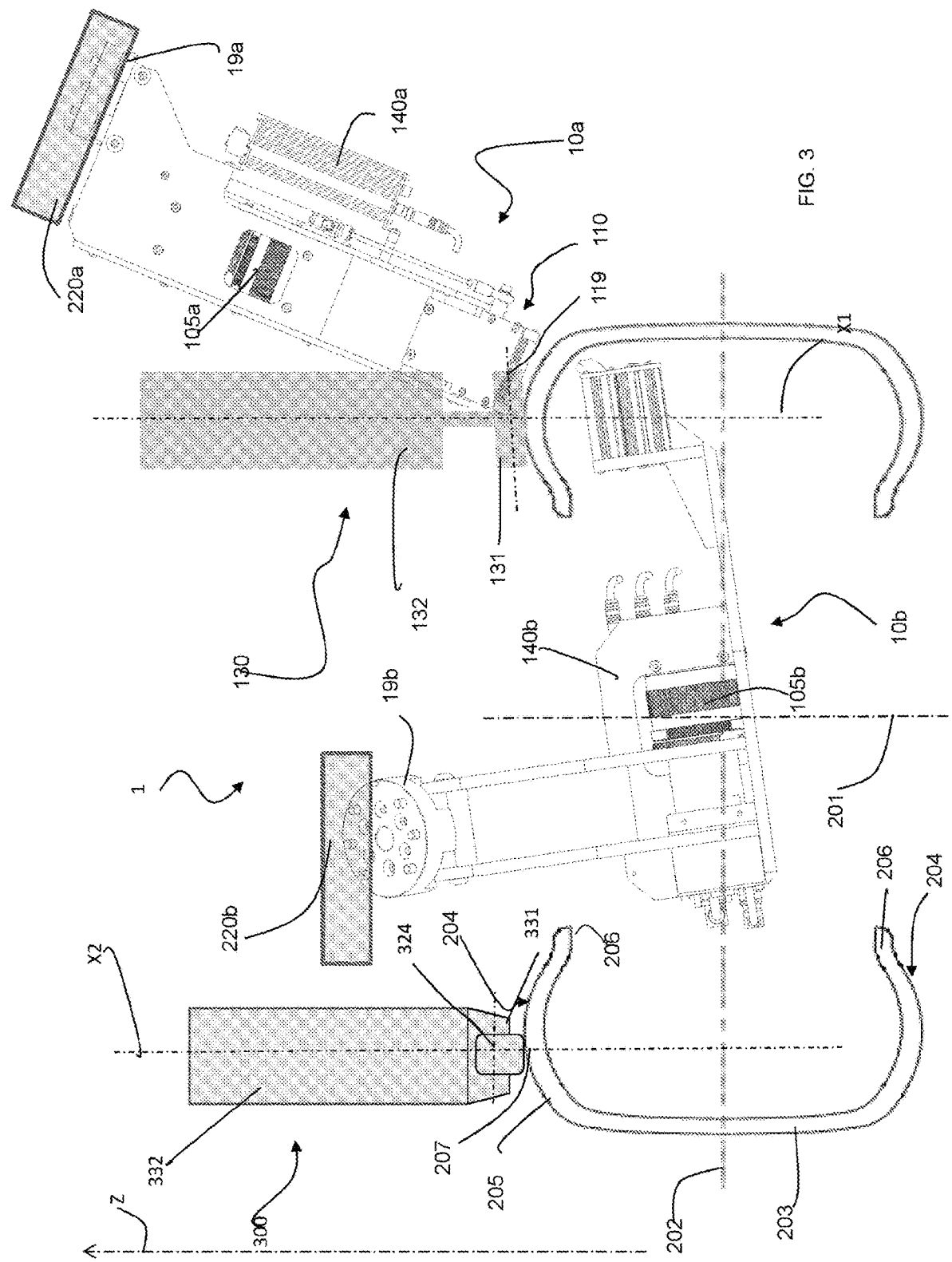
FIG. 3 shows the apparatus of FIG. 2 in a distinct operative step.

An apparatus for checking tyres in a tyre production line according to the present invention is globally indicated with 1 and depicted in FIGS. 1-3. In general, the same reference numeral will be used for possible variant embodiments of similar elements.

The apparatus 1 comprises a support 102 (visible in FIG. 1) adapted for supporting a tyre 200 on a wall and for rotating the same around its rotation axis 201, typically arranged according to the vertical, indicated with Z in the figures. The support 102 preferably lies on a horizontal plane and is typically actuated by a moving member not described and illustrated any further, since it can as an example be of the known type. The support 102 for the tyre 200 can possibly be configured to lock it, for example the respective resting bead. The tyre 200 resting in the support therefore defines a free wall, representing the portion not resting on the support and facing, in a system of axes coordinated with the axis Z perpendicular to the plane of the support as depicted, upwards. Preferably, the axis Z is parallel to the rotation axis 201.

With reference to FIGS. 2 and 3, the tyre 200 has a substantially toroidal structure around the rotation axis 201, and has an axial mid-plane 202 (represented in section by a broken line in FIGS. 2 and 3) perpendicular to the rotation axis 201. The tyre is made up of a crown 203 and of walls 204. In turn, the latter are each made up of a shoulder area 205, a bead area 206 and a radially central area or sidewall 207 arranged between shoulder and bead, as can be seen in FIGS. 2 and 3.

The apparatus 1 includes a first deformation system 130, for example moved through controls coming from a processing unit 180 (visible in a schematic manner in FIG. 1), which goes into contact with the tyre, preferably at its wall 204, to deform a portion thereof, for example preferably through the application of a force against the wall 204 so as to deform a first portion, more preferably in the direction of the mid-plane 202.

Preferably, the first deformation system 130 comprises a first deformation element 131 and is moved by a first positioning actuator 132 adapted for moving the first deformation system 130 along the direction of the compression force. As an example, the first positioning actuator 132 can be a pneumatic cylinder or comprise a plurality of pneumatic cylinders. Therefore, the first deformation element 131 can be brought into contact with or away from the tyre 200 through the first positioning actuator 132. Preferably, the first deformation element 131 comprises a thrusting roller.

In the movement in a direction towards or away from the tyre 200, preferably the first positioning actuator 132 ensures that the first deformation element 131, in this case the roller, carries out at least one substantially linear movement, i.e. a translation, which includes a component along a first axis, called X1 in the figures, parallel to the rotation axis 201 of the tyre 200. Preferably, this first axis X1 is also parallel to the vertical axis Z.

More preferably, the movement of the deformation element 131, thanks to the first positioning actuator 132, in a direction towards or away from the tyre 200 is substantially totally along the first axis X1. The positioning actuator 132 can for example include a plurality of slides (not visible in the figures), one or more slides adapted for moving the deformation element in a plane parallel to the support and a further slide for the vertical movement, i.e. along the first axis.

Therefore, preferably, the first positioning actuator 132 that is associated with the first deformation system 130 comprises a radial moving member comprising first slides adapted for solidly moving the deformation element 131 along the radial direction of the tyre, so that the first deformation element can be moved away from the tyre when not in use. Furthermore, the first positioning actuator 132 is adapted for translating the first deformation element 131 along the axis X1 towards or away from a first portion of the tyre.

Preferably, the thrusting roller is rotatable around a rotation axis thereof, indicated with 119 in FIGS. 2, 3 and 4. The axis 119 of the thrusting roller preferably lies on a plane passing through the axis 201 of the tyre 200 and through the radial direction of the portion of wall subjected to deformation. Preferably, the axis 119 of the thrusting roller, in the absence of forces, in other words in rest position, is perpendicular to the axis of the tyre 201. The axis of the roller, in operation, can differ from such a perpendicular condition with the axis of the tyre (as shown for example in FIG. 2) for example within a range of about 30°.

Furthermore, the thrusting roller, visible in detail in FIG. 4, comprises a section, taken in a plane perpendicular to the rotation axis 119, which is substantially circular. A diameter of the section is preferably variable, from a minimum diameter present at a first end 118a and at a second axially opposite end 118b of said roller along the rotation axis 119 to a maximum diameter present in a central area of the roller.

Preferably, the first deformation system 130 is adapted for elastically deforming a first portion of a wall of the tyre 200, preferably applying a compression force on an outer contact surface belonging to the first portion of wall, pressing the aforementioned thrusting roller on the outer contact surface. The force applied or the movement imposed on the outer contact surface preferably includes a component along the axis X1 i.e. along the rotation axis 201 of the tyre 200 and has a value that is preferably predetermined and depends on the type of tyre to be checked. The tyres 200 can have a different elasticity and deformability according to the type and model, therefore the force applied or the deformation imposed by the first deformation system 130 preferably depends on the type of tyre 200 to be checked. The deformation involves both the inner surface and the outer surface of the tyre 200, i.e. a deformation generated by the first deformation system 130 acting on a first portion of wall of the tyre consequently defines a first deformed portion of outer surface of the tyre and a first deformed portion of inner surface of the tyre 200.

The apparatus 1 preferably includes a second deformation system 300. The second deformation system 300 comprises a second deformation element 331 and is moved through a second positioning actuator 332 adapted for moving the second deformation system 300 towards and away from the tyre 200.

The second deformation element 331 preferably comprises a thrusting element configured to apply a force F aimed towards the axial mid-plane 202 to a surface belonging to a second portion of tyre, preferably of the free wall.

Preferably, the thrusting element comprises a cog arranged with rotation axis 324 preferably horizontal, i.e. parallel to the support 102, and, in use, oriented substantially according to a radial direction of the tyre resting on the support 102.

The thrusting element is associated with the second positioning actuator 332 that is configured to push it against the free wall 204 along a thrusting direction. The thrusting element 331 is brought towards the surface of a second portion of the tyre, through the second positioning actuator 332, in a direction that comprises at least one component along a second axis X2 parallel to the rotation axis of the tyre 201.

The second positioning actuator 332 is therefore preferably adapted for bringing the thrusting element towards the second portion of free wall 204 of the tyre 200, preferably along the vertical.

The first positioning actuator 132 and the second positioning actuator 332 can be of similar construction, for example, the actuators described above can be of any type (pneumatic, oil-hydraulic, electrical actuators . . . ), preferably of the type having a cylinder with mobile piston.

Preferably, the apparatus 1 includes means, not visible, like for example a probe, for determining the position, for example the height, of the free wall of the tyre 200, with respect to the support 102, i.e. the height along the vertical, of the free wall of the tyre. Alternatively, such a position or height is known from a database that can be suitably consulted.

The first axis X1 and the second axis X2 are parallel to one another and parallel with respect to the rotation axis of the tyre 201, intersect the free wall 204 of the tyre in a first and a second portion that are deformed by a first and a second force, respectively applied by the first deformation system 130 and by the second deformation system 300. Such a first or second force in every portion, the first or the second, elastically deforms the tyre generating a first deformed portion or a second deformed portion. The deformation of the first and second portion makes it possible to identify the defects in the deformed portions as detailed hereinafter.

The point of intersection of the first axis X1 and the point of intersection of the second axis X2 with the support 102, considering the rotation axis of the tyre 201 are centre of symmetry, are positioned at an angle comprised between about 90° and about 180°. In other words, considering a first plane containing both the first axis X1 and the rotation axis 201 of the tyre and a second plane containing both the second axis X2 and the rotation axis 201 of the tyre, the two planes form an angle comprised between about 90° and about 180°.

In this way, the first portion and the second portion of free wall are substantially totally separate and due entirely, respectively, to the force applied by the first deformation system 130 and to the force applied by the second deformation system 300, without interaction of the two forces in the deformation of a same portion of free wall.

The first portion deformed by the first deformation system 130 is preferably analysed through the illumination and detection of images, whereas the second portion deformed by the second deformation system 300 is preferably used to identify the so-called "weak sidewall".

The apparatus 1 advantageously comprises a first robotised arm 220a on which a first device 10a is mounted; in particular, the first device 10a comprises a first attachment member 19a for coupling with an end of the first robotised arm 220a. The first robotised arm 220a is represented in a very schematic manner in FIGS. 2 and 3. Preferably, the first robotised arm 220a is of the anthropomorphous type. Even more preferably, the first robotised arm 220a is of the anthropomorphous type with at least five axes/degrees of freedom.

The first device 10a is adapted for the illumination and detection of images on the outer surface of the tyre 200, and in particular on the first portion of outer surface deformed by the first deformation system 130.

With reference now to FIGS. 5 and 6, the first device 10a is represented in simplified form to clearly identify the functional parts thereof. Preferably, the first device 10a comprises a first detection system 104a comprising a first camera 105a. The first camera 105a is preferably a linear camera having a first target line 106a lying on a first optical plane 107a passing through the first camera itself. Moreover, the first camera 105a defines a first focal plane 121a in which a portion to be illuminated of outer surface of tyre is substantially focused on. Preferably, the first optical plane 107a of the first camera 105a and the first focal plane 121a are perpendicular to one another (see for example FIG. 5 or 6).

The first device 10a also comprises a first light source 110 adapted for emitting a first light radiation to illuminate a linear portion of outer surface 212 (visible in FIGS. 1 and 6) of said tyre 200 coincident with the first target line 106a (for example when the surface portion is planar) or close to the first target line 106a (due to the curvilinear shape of the surface of the tyre). The linear portion of outer surface 212 belongs to the first portion deformed by the first deformation system 130.

The first detection system 104a is adapted for acquiring a respective two-dimensional digital image of the linear portion of surface illuminated by the first light source 110.

The first light radiation emitted by the first light source 110 is diffused on the linear surface portion 212 of the tyre 200. The first detection system, through the first camera 105a, is adapted for acquiring a respective first two-dimensional digital image of the linear surface portion 212 illuminated by the first light radiation.

Preferably, the first light source 110 consists of two sub-sources, a first sub-source 113a and a second sub-source 113b, respectively, arranged on both sides of the first optical plane 107a and symmetrically with respect to such a plane. More in particular, the first sub-source 113a and the second sub-source 113b of the first light source 110 are arranged symmetrically with respect to the first optical plane 107a and are more preferably equidistant from it.

Preferably, the first sub-source 113a and the second sub-source 113b of the first light source 110 are the same distance $d_{1a}$ and $d_{1b}$ from the first focusing plane 121 (i.e. $d_{1b}=d_{1a}$). Therefore, when the two sub-sources are joined by a plane, called P1 (see FIG. 5), they define a plane P1 substantially parallel to the first focusing plane 121a of the first linear camera 105a and distant from it by a value $d_{1a}$ comprised between about 55 mm and about 75 mm. As an example, such a value can be 65 mm.

Each sub-source 113a, 113b of the first light source 110 has a respective main direction of extension (represented by a broken line 114 in FIG. 6) that extends preferably substantially parallel to the first optical plane 107a and thus to the first target line 106a. Therefore, the two sub-sources 113a, 113b are preferably parallel to one another, i.e. aligned, along their dimension of greatest extension 114.

As an example, the sub-sources 113a, 113b have a dimension along the main direction of extension 114 comprised between about 5 cm and about 15 cm and a dimension along the direction perpendicular to the main direction of extension 114 comprised between about 2 cm and about 3 cm.

Each sub-source 113a, 113b typically comprises a plurality of LED sources 169 arranged aligned along the main direction of extension 114. Preferably, each sub-source 113a, 113b comprises, positioned above each LED source 169, a converging lens 170, adapted for converging the light beam emitted by the LED source 169 by about 30°, as represented in FIG. 9. The light beam emitted by each LED source 169 is therefore preferably restricted to an angle comprised between about 20° and about 40°.

A representation of an embodiment of the first device 10a represented in a simplified manner in FIGS. 5-6 and 9 is given in FIGS. 7 and 8.

Each sub-light source 113a, 113b includes a support, preferably made of aluminium, on which the LED sources 169 are fixed. The supports are all indicated with 168 in the attached figures (see FIGS. 7 and 8). Preferably, the LED sources 169 are fixed to the respective support 168 through a thermo-conductive paste (not visible in the figures). Advantageously, each support 168 also includes, in an outer surface not in contact with the LED sources 169, a fin arrangement for the dissipation of heat (not visible in the figures).

The first sub-source 113a and the second sub-source 113b of the first light source 110 are positioned between two plates 11, 12 arranged substantially perpendicular to the main direction of extension 114 of the first light source 110 and substantially parallel to each other. Between the two plates 11, 12, which extend downstream of the first light source in the direction of emission of the light, the first linear camera 105a is also positioned.

The two sub-sources 113a, 113b of the first light source 110 are arranged so that for their entire extension in a view perpendicular to the optical plane 107a they lie between two planes perpendicular to the first target line 106a. In other words, all of the first and second ends of the sub-sources 113a, 113b with respect to the main direction of extension 114 lie on a respective plane perpendicular to the first target line.

Preferably, the first device 10a comprises a first drive and control unit 140a configured to activate said first light source 110 and activate the first linear camera 105a to acquire a respective two-dimensional digital image (in colour or monochromatic) of the linear surface portion 212, preferably in synchrony with the activation of one or more of said first sub-light source 113a and second sub-light source 113b.

Preferably, the first drive and control unit 140a is fixed to a support plate 11, 12 of the first light source 110 and of the first camera 105a so as to send signals relative to the control of the sub-light sources 113a, 113b without waiting times.

Preferably, the processing unit 180 is adapted for driving the first deformation system 130 and the first robotised arm 220a so as to take the deformation element 131 towards or away from the tyre 200 to deform or not the first surface portion, whereas the first robotised arm 220a takes the first device 10a to a predetermined distance from the outer surface of the first portion of free wall of the tyre to be illuminated and to be checked, said outer surface having been deformed.

For greater dissipation of heat, moreover, the first unit 140a also comprises a fin arrangement 166 (visible in FIG. 7).

The apparatus 1 also preferably includes a second device 10b preferably moved, through control signals sent by the processing unit 180, through a second robotised arm 220b. The second device 10b is preferably adapted for illuminating and detecting images of portions of the inner surface of the tyre 200 (see FIG. 1) and more preferably surfaces that form part of the inner surface of the first portion of free wall of tyre deformed by the first deformation system 130. Therefore, preferably a check of an inner as well as outer surface of the tyre that delimit the first portion of deformed free wall is carried out.

With reference now to FIGS. 10 and 11, the second device 10b is represented in simplified form to clearly identify the functional parts thereof. Preferably, the second device 10b comprises a second detection system 104b comprising a second camera 105b. The second camera 105b is preferably a linear camera having a second target line 106b lying on a second optical plane 107b passing through the second camera itself. Moreover, the second camera 105b defines a second focal plane 121b in which a portion to be illuminated of tyre surface is focused on. Preferably, the second optical plane 107b and the second focal plane 121b are perpendicular to each other (see for example FIG. 10 or 11).

The second device 10b also comprises a second light source 108 and a third light source 109 adapted for respectively emitting a second light radiation and a third light radiation to illuminate an inner linear surface portion 213 (visible in FIGS. 1 and 10) of said tyre 200 coincident with the second target line 106b (for example when the surface portion is planar) or close to the second target line 106b (due to the curvilinear shape of the surface of the tyre).

The second detection system 104b is adapted for acquiring a respective two-dimensional digital image of the linear surface portion illuminated by at least one from the second light source 108 and the third light source 109, and deformed by the first deformation system 130.

The second light radiation emitted by the second light source 108 is grazing on the linear surface portion 213 of the tyre 200, whereas the third light radiation emitted by the third light source 109 is diffused on the surface portion 213 of the tyre 200.

The second detection system 104b, through the second camera 105b, is adapted for acquiring a respective two-dimensional digital image of the linear surface portion 213 illuminated by at least one from the second light radiation and the third light radiation.

Preferably, the second light source 108 consists of two sub-sources, a third sub-source 111a, and a fourth sub-source 111b, the two sub-sources 111a, 111b, being positioned symmetrically with respect to the optical plane 107a. Preferably, the two sub-sources 111a and 111b respectively lie at opposite sides with respect to the second optical plane 107b and are equidistant from it, so that grazing radiation coming from opposite half-spaces with respect to the second optical plane 107b of the second camera 105b reach the inner linear surface portion 213.

Preferably, the sub-sources 111a, 111b of the second light source 108 are the same distance $d_{2a}$ and $d_{2b}$ from the second focusing plane 121b (i.e. $d_{2a}=d_{2b}$). Therefore, forming a plane P3 that joins the two sub-sources 111a and 111b, it is substantially parallel to the second focusing plane 121b of the second linear camera 105b and is preferably distant from it by a value comprised between about 55 mm and about 65 mm. The plane P3 and its distance from the second focusing plane 121b called $d_{2a}$ (which is equal as stated to $d_{2b}$) is schematically represented in FIG. 11.

Preferably, the third light source 109 consists of four sub-sources, a fifth sub-source 112a, a sixth sub-source 112b, a seventh sub-source 112c and an eighth sub-source 112d, respectively, distributed in pairs on both sides of the second optical plane 107b and symmetrically with respect to such a second plane. More specifically, the fifth sub-source 112a and the sixth sub-source 112b of the third light source 109 are arranged symmetrically with respect to the second optical plane 107b and are more preferably equidistant from it, the seventh sub-source 112c and the eighth sub-source 112d are arranged symmetrically with respect to the second optical plane 107b and more preferably are equidistant from it.

Preferably, the fifth sub-source 112a and the sixth sub-source 112b of the third light source 109 are the same distance $d_{3a}$ and $d_{3b}$ from the second focusing plane 121b (i.e. $d_{3b}=d_{3a}$). Therefore, when the two sub-sources are joined by a plane (again see FIG. 11), they define a plane P2 substantially parallel to the second focusing plane 121b of the second linear camera 105b and distant from it by a value $d_{ia}$ comprised between about 85 mm and about 95 mm. Similarly, the seventh sub-source 112c and the eighth sub-source 112d of the third light source 109 are the same distance $d_{3c}$ and $d_{3d}$ from the second focusing plane 121b (i.e. $d_{3c}=d_{3d}$). Therefore, when the two sub-sources 112c and 112d are joined by a plane, they define a plane P4 substantially parallel to the second focusing plane 121b of the second linear camera 105b and distant from it by a value comprised between about 75 mm and about 85 mm.

Preferably, the distance $d_{3a}=d_{3b}$ between the fifth sub-source 112a and the focusing plane 121b and between the sixth sub-source 112b and the second focusing plane 121b of the second linear camera 105b is greater than the distance $d_2$ between the second light source 108 and the focusing plane 121b. More preferably, the distance $d_{3c}=d_{3d}$ between the seventh sub-source 112c and the second focusing plane 121b or between the eighth sub-source 112d and the second focusing plane 121b is intermediate between the distance of the fifth sub-source 112a and of the sixth sub-source 112b and the second focusing plane 121b and the distance of the second light source 108 and the second focusing plane 121b. As a result the third light source 109 of diffused light is further from the linear surface portion 213 of the tyre 200 to be illuminated with respect to the second light source 108, whereas the second light source 108 generating grazing light is positioned closer. In this way, it is possible to obtain an grazing light with a correct geometry of the second device 10b.

Each sub-source 111a, 111b, 112a, 112b, 112c, 112d has a respective main direction of extension (represented by a broken line 115 in FIG. 10) that preferably extends substantially parallel to the second optical plane 107b and thus to the second target line 106b. Therefore, all of the sub-sources 111a, 111b, 112a, 112b, 112c, 112d, are preferably parallel to one another, i.e. aligned, along their dimension of greatest extension.

As an example, the sub-sources 111a, 111b, 112a, 112b, 112c, 112d, have a dimension along the main direction of extension 114 comprised between about 5 cm and about 15 cm and a dimension along the direction perpendicular to the main direction of extension 115 comprised between about 2 cm and about 3 cm.

Each sub-source 111a, 111b, 112a, 112b, 112c, 112d, typically comprises a plurality of LED sources 169 arranged aligned along the main direction of extension 115. Preferably, each sub-source 111a, 111b, 112a, 112b, 112c, 112d, comprises, positioned above each LED source 169, a converging lens 170, adapted for converging by about 30° the light beam emitted by the LED source 169, as represented in FIG. 9.

The light beam emitted by each LED source 169 is therefore preferably restricted by an angle equal to between about 20° and about 40°. Preferably the sub-sources 111a, 111b, 112a, 112b, 112c, 112d, are made in an analogous manner to the sub-sources 113a, 113b of the first device 10a.

A representation of an embodiment of the second device 10b represented in a simplified manner in FIGS. 10-11 is given in FIGS. 12 and 13.

With particular reference to FIGS. 12 and 13, each of said second light source 108 or third light source 109, also includes a support 168, preferably made of aluminium, on which the LED sources 169 are fixed. Preferably, the LED sources 169 are fixed to the respective support 168 through a thermo-conductive paste (not visible in the figures). Advantageously, each support 168 also includes, in an outer surface not in contact with the LED sources 169, a fin arrangement 167 for the dissipation of the heat.

Typically, the second device 10b is coupled through an attachment 19b with the second robotised arm 220b (schematically represented in FIGS. 2, 3 and 13) on which the second light source 108 and the third light source 109, as well as the detection system 104b are mounted. Preferably, the second robotised arm 220b is of the anthropomorphous type. Even more preferably the second robotised arm 220a is of the anthropomorphous type with at least five axes/degrees of freedom.

More in particular, the second device 10b comprises a first support 161, to which the second linear camera 105b is fixed and a second support 162 to which the second light source 108 and the third light source 109 are fixed. The first support 161 and the second support 162 are made to form a unit with each other by a connecting arm 164.

The second support 162 comprises two equidistant plates 11b and 12b, between which the second light source 108 and the third light source 109 are arranged. Therefore, each sub-source 111a, 111b, 112a, 112b, 112c, 112d is connected with a first axial end thereof to the first plate 11b and with a second axial end thereof to the second plate 12b. In this way, along the main direction of extension 115, the sub-sources 111a, 111b, 112a, 112b, 112c, 112d, preferably are the same length being substantially confined between two planes parallel to one another.

Preferably, therefore, second camera 105b, second light source 108 and third light source 109 form a unit with each other and their relative distance is defined in the assembly step of the second device 10b and is kept fixed.

Preferably, the second device 10b comprises a second drive and control unit 140b configured to selectively activate one or more of said second light source 108 and third light source 109 to illuminate said inner linear surface portion 213 and to activate the second linear camera 105b to acquire a respective two-dimensional digital image (in colour or monochromatic) of the inner linear surface portion 213, preferably in synchrony with the activation of one or more of said second light source 108 and third light source 109.

Preferably, the second drive and control unit 140b is mounted so as to form a unit with the second camera 105b, with the second light source 108 and with the third light source 109, in particular it is fixed to the first support 161 of the second device 10b. Moreover, preferably, the second drive and control unit 140b comprises a fin arrangement 142, for greater dissipation of heat.

The second device 10b also comprises a mirror 150 defining a reflective plane arranged perpendicular to the optical plane 107b. The mirror 150 is arranged between the two sub-sources 111a and 111b of the second light source 108, so as to reflect the target line by an angle comprised between about 60° and about 120°. Preferably, the mirror 150 is divided into two halves by the optical plane 107b that crosses a middle line thereof. Preferably, therefore, the mirror 150 is arranged not only between the sub-sources 111a-111b of the second light source 108, but is in the middle between, in sequence of spatial position, the seventh sub-source 112c, the fifth sub-source 112a on one side of the second optical plane 107b, and the sixth sub-source 112b and the eighth sub-source 112d on the other side of the second optical plane 107b.

The mirror 150 also defines a main direction of extension indicated with 118 in FIG. 10. The main direction of extension is a straight line that belongs to the second optical plane 107b. This main direction of extension 118 of the mirror is inclined with respect to the main direction of extension 115 of the sub-sources 111a, 111b, 112a, 112b, 112c, 112d. As stated earlier, preferably the sub-sources 111a, 111b, 112a, 112b, 112c, 112d, share a substantially common main direction of extension, being parallel to one another. This common main direction of extension 115 of the sub-sources preferably forms an angle comprised between 30° and 60° with the main direction of extension 118 of the mirror 150. More preferably, it forms an angle of about 45°.

Moreover, a minimum distance d (see again FIG. 11) between the mirror 150 and the second focusing plane 121b of the second linear camera 105b passing through the reflected second target line 106b is less than a minimum distance between any one from the second light source 108 or the third light source 109 and the second focusing plane 121b. In FIG. 11, the minimum distances of the sub-sources are equal to the distance of the plane passing through the sub-sources and the second focusing plane 121b, since the sub-sources 111a, 111b, 112a, 112b, 112c, 112d, are substantially arranged parallel to the second focusing plane 121b.

Preferably, the length L of the mirror 150 along its main direction of extension 118 is greater than the length ls of any of the sub-sources 111a, 111b, 112a, 112b, 112c, 112d, along their main direction of extension 115. More preferably, calling the angle formed between the two directions 115 and 118 α, gives L cos α>ls.

In this way, as can be seen more clearly from FIGS. 10 and 11, the mirror 150 is the element that extends, at least with respect to the sources, the closest to the second focusing plane 121b, in particular with an end thereof 150a, the end along its main direction of extension 118. In other words, the end 150a of the mirror protrudes with respect to the axial ends of the sub-sources 111a, 111b, 112a, 112b, 112c, 112d, in the direction of the second focusing plane 121b.

With reference to FIGS. 1 to 3 the operation of the apparatus 1 will now be described in detail.

A first surface portion to be checked, i.e. a first portion of a free wall of tyre for which it is wished to check a surface portion, preferably both inner and outer, is selected in the outer surface of the tyre. Preferably, but not exclusively, this first portion belongs to the shoulder or to the sidewall of the tyre 200.

The first deformation system 130 is adapted for deforming the first selected portion of wall of the tyre 200 in order to better identify the defects present, in its corresponding inner and outer surface. The defects searched for can for example be irregularities on the surface of a tyre (unvulcanised compound, alterations in shape, etc.), structural unevenness, presence of foreign bodies on the surface. Among structural unevenness defects, so-called "carcass cuts" are particularly critical, which are rare but potentially very dangerous defects, generated in the interface region between two portions of the tyre having different chemical-physical characteristics, like for example different compounds.

Such defects are in the form of small cuts, typically extending longitudinally, i.e. they follow the circular extension of the tyre, characterised by perfectly matching edges—between which there is no removal or lack of material, this being a characteristic that makes them particularly difficult to identify. The carcass cuts can also involve portions of the carcass arranged close to the surface of the tyre, for example close to the inner surface, under the layer of liner typically present. In this case typically the liner itself is involved in the cuts, also having a laceration at the carcass cuts and thus making it possible to identify it through optical inspection.

By suitably deforming a portion of free wall of a tyre to be checked it is possible to decrease the outer and inner radius of curvature of a deformed surface portion of the tyre, thus highlighting possible defects, in particular carcass cuts and other cuts or holes, since the accentuation of the normal external convexity tends to 'open' the edges or perimeters of such defects, making them easier to identify in the subsequent image processing.

The images detected of this adequately compressed surface portion thus have a high quality and/or contain information in number and quality such as to allow a subsequent automatic processing of the latter in order to detect possible defects existing, making the algorithms for automatically detecting defects used for this purpose highly effective. This type of defect, in order to be properly identified, requires an illumination of relative high power and close to the deformed portion of tyre, i.e. positioning of the device very close to the deformation element 131, otherwise the cut opened by the deformation element "closes" as soon as a distance is reached from the area in which the deformation takes place.

For this reason a diffused light and preferably with relatively high power is the best solution for highlighting such a defect in the outer surface of the first portion of deformed free wall of the tyre, diffused light coming from the first device 10a including the first light source 110.

In the corresponding inner surface of the first deformed portion of free wall, the possible defects present, for example the possible cuts, are "opened" increasing the concavity of the inner surface due again to the compression. In order to become more visible, these defects need a particular illumination, with light radiation that arrives from "the sides" of the cut itself, preferably from "both sides", i.e. they require an illumination through grazing illumination. Moreover, even more preferably, the preferred illumination is a combination of grazing and diffused radiation, like that coming from the second device 10b.

In the way described hereinafter, the optimal light radiation for identifying defects both in the inner and outer portion of the deformed wall is provided, simultaneously during the deformation.

The processing unit 180 drives the first deformation system 130 to go into contact with the tyre, with a movement having at least one component along the first axis X1, preferably at the first portion of its free wall 204, so as to apply a force against it and deform the surface thereof, both inner and outer, as can be seen in FIG. 2. The first deformation system 130 comes into contact with a portion of outer surface of the first portion of the tyre 200 and its compression action generates a first deformed portion of outer surface and a corresponding deformed portion of inner surface. Preferably, as represented in FIG. 2, the portion of surface on which the deformation system 130 acts is a portion of the outer surface of the shoulder 205 of the tyre 200. Preferably, the entire remaining portion of the wall 204 of the tyre 200 remains undeformed. As an example, the compression force is such as to deform the first portion of wall 204 so that the maximum excursion, taken between all of the points of said portion of wall, between the position in the absence of forces and the deformed position, the excursion being taken along the direction of the compression force, is equal to a value comprised between about 0 mm and about −30 mm (zero being fixed on the free outer surface).

This deformation is elastic, in other words when the deformation system 130 is removed, the first deformed portion of wall goes back to its initial configuration and shape, before the deformation by the first deformation system 130.

The first robotised arm 220a and the second robotised arm 220b respectively carrying the devices 10a and 10b are consequently brought towards the first deformed portions of outer and inner surface, respectively.

The first device 10a can get substantially close to the first deformation system 130 (again see FIG. 2), thanks to its very compact configuration, to illuminate and acquire images of the portion of outer surface of tyre 200 belonging to the first portion deformed by the first deformation system 130. The processing unit 180 drives the robotised arm 220a to take the first light source 110 towards the first deformed outer portion of the surface of the tyre 200, so that a linear portion 212 of surface inside the first outer deformed portion is at least partially coincident with or close to the target line in the first focal plane 121a. Preferably, the distance between the first deformation system 130, in particular thrusting roller 131, and the first device 10a is comprised between about 30 mm and about 50 mm. Preferably, if the first deformed portion is a shoulder portion, like in FIG. 2, the first portion of deformed and illuminated outer surface is a portion of sidewall.

In a substantially analogous manner, a second portion of free wall is selected, towards which the second deformation system 300 is moved, with a movement including at least one component along the second axis X2, generating a second deformed portion of free wall.

The processing unit 180, therefore, drives the moving member of the support 102 to set the tyre 200 in rotation.

The first deformation system 130 and the second deformation system 300 keep the respective thrusting roller or cog against the respective portion of tyre, the first deformation system and the second deformation system preferably maintaining their position and the thrusting roller or the cog rotating on the free wall 204.

The deformation due to the force F applied by the second deformation system 300 can for example be examined as described in patent application WO 2015/0079370 to the Applicant in order to determine the so-called defect of "weak sidewall".

At the same time in which the defect of "weak sidewall" is checked by measuring the variations of force or of height of the outer surface of the second portion of free wall 204, thanks to the second deformation system 300 that deforms a portion of the tyre, preferably the first portion of free wall of tyre deformed by the first deformation system 130 is also analysed. As a function of the angular position signal received by an encoder, with the rotation of the tyre in progress, the first drive and control unit 140a of the first device 10a cyclically activates in rapid sequence the first light source 110 and activates the first linear camera 105a to acquire a respective two-dimensional digital image (in colour or monochromatic) of the respective outer linear surface portion in synchrony with the activation of the first light source 110. The first control unit 140a will drive, in parallel, the switching on of the two sub-sources 113a, 113b, which work in synchrony with each other and in synchrony with the first linear camera 105a. The two sub-sources 113a, 113b, therefore switch on simultaneously.

More preferably, the first drive and control unit 140a drives the first light source 110 to emit a diffused light radiation on the first portion of outer surface 212 of the tyre 200, for example at a predetermined frequency. Such a stroboscopic frequency is for example equal to 0.1 ms. The first drive and control unit 140a further controls the first camera 105a to acquire an image of the deformed outer surface portion illuminated by the first light source 110 in synchrony with the illumination thereof. Therefore, a plurality of "first images" of the surface portion of tyre 200 illuminated every time the first light source 110 that illuminates the portion with diffused light radiation is switched on is acquired by the first camera 105a.

Therefore, every time the first light source 110 is switched on, a first image is acquired of an outer surface portion of the tyre belonging to the first deformed portion. With the rotation of the tyre, a plurality of linear images, or first images, are acquired, one for every angular position of the tyre.

Once the desired rotation of the tyre 200 has been carried out to examine the desired surface portion, preferably at least one complete rotation to acquire the entire circular extension, a digital image of a tyre "ring" is obtained, that is made with all of the first digital images of the sequence of linear portions each illuminated with the first light source. For a complete 360° image for example 25,000 single linear images are used. At the same time as the compression by the first deformation system 130 and as the illumination of the portion of outer surface, for example belonging to the sidewall 207 of the tyre 200, according to the invention a surface portion is checked in the inner surface of the tyre 200. Preferably, but not exclusively, this portion of inner surface to be checked belongs to the shoulder 205 of the tyre 200, if, according to FIG. 2, a portion of the shoulder 205 is compressed.

For this check, for example, as depicted in FIG. 2, the second device 10b is partially inserted inside the tyre 200 and brought closer—through the robotised arm 220b—to the inner portion of shoulder 205. The second device 10b is brought closer until a portion 213 of the inner surface is substantially at its second focusing plane 121b.

The second light source 108 and the third light source 109 are driven by the second drive and control unit 140b to emit a light radiation on the inner linear surface portion 213 of the tyre 200. The second light source 108 emits grazing light radiation coming from opposite half-spaces with respect to the second optical plane 107b, on the linear surface portion 213, whereas the third light source 109 emits diffused radiation on the linear portion 213. Preferably, both of the light sources emit light radiation at a predetermined frequency. The illumination with each light source, however, takes place alternately: in other words for every time period only one from the second light source 108 or the third light source 109 is switched on, whereas the other of the two remains switched off. Preferably, the four sub-light sources 112a, 112b, 112c, 112d, of the third light source 109 are switched on together, i.e. in a given time period either all four are switched on or all four are switched off. Such a stroboscopic frequency is for example equal to 0.064 ms. Differently, the two sub-sources 111a, 111b of the second light source 108 are switched on alternately, i.e. one or the other, so that the deformed inner surface portion is illuminated either by an grazing light from the right of the optical plane 107b or from the left thereof.

The light coming from the second light source 108 or from the third light source 109 is reflected by the inner surface of the shoulder 205 of the tyre that has been illuminated and is re-directed through the mirror 150 towards the second camera 105b. The mirror 150 causes a deflection of the trajectory of the light beams by an angle comprised between about 60° and about 120°, more preferably about 90°.

The second drive and control unit 140b preferably controls the second camera 105b so as to acquire an image of the inner surface portion illuminated by the third sub-source 111a or by the fourth sub-source 111b of the second light source 108 or by the third light source 109 in synchrony with the illumination thereof. Therefore, advantageously, the second camera 105b acquires an image of the inner surface portion of tyre 200 illuminated each time the third sub-source 111a of the second light source 108 that illuminates the portion with grazing light from one side of the second optical plane 107b is switched on, an image of the surface portion of tyre 200 illuminated each time the fourth sub-source 111b of the second light source 108 that illuminates the portion with grazing light from the other side of the second optical plane 107b is switched on and an image of the surface portion of tyre 200 illuminated each time the third light source 109 that illuminates the portion with diffused light is switched on. In this way, advantageously, for every inner surface portion 213 three distinct images to be processed are acquired in which the same portion is illuminated with a radiation having distinct characteristics. In this way it is possible to acquire both an image in diffused light and two images in grazing light of the same surface portion. These three images can also form distinct portions of a single two-dimensional image, in which a first portion is obtained with the diffused light, a second portion with grazing light from a first direction of the optical plane (for example from the right) and a third portion with grazing light from a second opposite direction of the optical plane (for example from the left).

Advantageously, in each of the operative positions represented in FIGS. 1-3, the support 102 in which the tyre is positioned (see FIG. 1) is set in rotation during the checking of the tyre itself. As stated above, the second drive and control unit 140b preferably controls the second camera 105b so as to acquire an image of the inner surface portion illuminated by the second light source 108 or by the third light source 109 in synchrony with the activation of the aforementioned camera 105b.

Preferably, as stated earlier, the apparatus comprises an encoder (not shown) for detecting the angular position of the support, the second drive and control unit 140b being configured to activate said second light source 108 and said third light source 109 and drive the detection system as a function of an angular position signal of the support sent by the encoder.

However, since the tyre is preferably in rotation while these three distinct images are acquired, they are not exactly the image of the same inner linear surface portion of tyre, since the latter is rotated during the switching on and off of the sources.

As an example, the time difference between the acquisition of the first linear image and of the second linear image, as well as between the second linear image and the third linear image and then cyclically between the first and third linear image, is less than 0.2 milliseconds. Therefore, in this very limited time period, the movement is "relatively small" and therefore it is still possible to state that, for substantially the same surface portion three linear images are obtained, each with a different illumination.

The expression "substantially a same surface portion" means that the first light source 110, the second light source 108 and the third light source 109, illuminate three respective surface portions that can be spatially shifted from one another but are comparable according to the present invention, i.e. show the same elements substantially in the same position. For example three surfaces can be shifted, on the plane of the surface itself, by a distance of less than 0.2 mm, preferably less than, or equal to, 0.1 mm. Advantageously, said distance is less than, or equal to, the linear dimension of surface associated with a pixel (the latter as an example being equal to 0.1 mm), in the case in which the detection system includes a linear camera. In other words, each pixel of the first linear image shows a micro-surface portion that is less than 0.2 mm away from the micro-surface portion shown by the pixel of the second linear image corresponding to each said pixel.

In other words, the three images can be substantially overlapped pixel by pixel, although the real linear surface portion associated with a single linear image does not coincide exactly for the three images, due to the rotation of the tyre that has occurred in the meantime. However, the choice of the acquisition frequency of the images and of the rotation speed is such that the three images are interlaced and thus comparable pixel by pixel. Advantageously, each pixel of the first (or second or third) image shows a micro-surface portion that differs from the micro-surface portion shown by the pixel of the second (or respectively third or first) image corresponding to each said pixel apart from the linear surface dimension associated with a pixel, as an example the spatial shift being equal to about one third of a pixel. In this way, the three images are interlaced and the acquisition of the three linear images takes place in a time period during which the tyre has rotated by a portion equal to a pixel (as an example equal to about 0.1 mm).

Once the desired rotation of the tyre has been carried out to check the desired inner surface portion, preferably at least one complete rotation to acquire the entire circular extension, a single digital image is obtained that is made with all of the digital images of the sequence of linear portions each illuminated with a respective light source. The processing unit 180 receives such an image from the detection system and extracts the corresponding first image, second image and third image of the entire desired surface portion therefrom.

In the case in which a single image is acquired as described above formed from a portion with diffused light [A], a portion with grazing light dx [B] and a portion with grazing sx [C], a succession repeated until the entire tyre is acquired, an overall image is obtained formed by the sequence ABCABCABCABCABCABCABCABCABC In processing this image is divided into three effective images, obtaining AAAAAAAA . . . BBBBBBBB . . . CCCCCCCC . . . .

Preferably, the processing unit 180 is also configured for the following functions: receiving the images acquired from the second linear camera 105b; and processing the images in order to check the surface portion. The processing unit 180 comprises for example a PC or a server. Preferably, the processing unit is adapted for processing the second image and third image to be processed obtained with grazing light by comparing them in order to obtain information on an altimetric profile of the surface portion. Preferably, the comparison between the second image and the third image to be processed comprises calculating a difference image in which each pixel is associated with a value representative of the difference between the values associated with the corresponding pixels in the second image and in the third image to be processed.

Preferably, before comparing the second image and the third image to be processed, both in grazing light, it is foreseen to equalise the second image and the third image to be processed, for example equalising the average luminosity thereof globally or locally. Preferably, the processing unit 180 processes the first image to be processed in diffused light to detect the possible presence of defects on the surface portion, using the information obtained by the aforementioned comparison between the second image and the third image to be processed.

Preferably, the processing unit 180 is configured to calculate the difference between the second image and the third image in grazing light in order to obtain information on an altimetric profile (e.g. possible presence or absence of projections and/or depressions) of the linear surface portion.

Preferably, calculating the difference between the second image and the third image comprises calculating a difference image in which each pixel is associated with a value representative of the difference between the values associated with the corresponding pixels in the second image and in the third image. In this way it is possible to use the image obtained from the difference between the second image and the third image to highlight the three-dimensional elements (such as the raised pitting on the inner surface of the tyre or the raised writing) and take into account such information in the processing of the image in diffused light to look for defects.

Optionally, a further portion of the surface of the tyre is selected, preferably but not necessarily always belonging to the wall 204 of the outer surface thereof, but distinct—at least partially—from the first portion. As can be seen in FIG. 3, from the shoulder 205 that has previously been selected as position where to carry out the deformation in FIG. 2, in FIG. 3 an outer surface portion of the sidewall 207 of the tyre was selected. The first deformation system 130 can thus be positioned, preferably again through the processing unit 180, at the portion of sidewall 207 of the tyre 200, so as to deform a third surface portion of the tyre, as depicted in FIG. 3. In this way, a new check can be carried out, bringing the first device 10a towards the tyre 200 so as to obtain an illumination of the further deformed outer surface portion of the tyre, preferably corresponding to an outer surface portion of the shoulder 205 of the tyre, and bringing the second device 10b towards the tyre 200 so as to illuminate a deformed inner surface portion, preferably corresponding to the sidewall 207. See for example the difference between the position of the deformation element 130 in FIG. 2 and in FIG. 3 and the consequent different position of the devices 10a, 10b in the two figures: in FIG. 2 the first light source 110 illuminates a central outer surface portion or sidewall 207 of the wall 204 of the tyre, whereas in FIG. 3 the first light source 110 illuminates an outer surface portion of the shoulder 205 of the tyre 200. Furthermore, in FIG. 2 the second light source 108 and the third light source 109 illuminate an inner surface portion of the shoulder 205, whereas in FIG. 3 the second light source 108 and the third light source 109 illuminate an inner surface portion corresponding to the sidewall 207. Moreover, in FIG. 2, the rotation axis 119 of the thrusting roller, positioned at the shoulder 205, is inclined with respect to the plane defined by the support of the tyre 200, whereas in FIG. 3 the rotation axis 119 of the thrusting roller is substantially perpendicular to the rotation axis 201 of the tyre 200.

The acquisition of the images through the first and the second camera 105a, 105b of the further outer and inner deformed surface takes place in an analogous manner to what is described for FIG. 2.

A correct illumination that depends on the defect sought and on the inner or outer position of the defect itself is even more relevant, in addition to what is detailed above, since during the illuminations and corresponding acquisitions of images through cameras described above, whereas the outer deformed surface and the inner deformed surface, respectively, are illuminated, there is a relative rotation between the tyre and three devices: deformation system, first light source and second light source with associated cameras. The relative rotation of the tyre around a rotation axis thereof advantageously allows a rapid check of an entire annular portion of the tyre in quick time. However, this further reduction of the time due to the relative rotation, preferably at a relatively high speed, means that the images acquired by the cameras are acquired at a high frequency and therefore the exposure time is very low. In a short exposure time the type of illumination provided is essential to obtain digital images of quality such as to be able to identify the defects of the tyre 200 in a subsequent processing.

At the same time as the images, the "weak sidewall" is also analysed. Three types of defects can therefore be detected simultaneously at two distinct portions of deformed wall. The two deformations do not cause a possible toppling of the tyre since they are angularly distant with respect to the tyre itself. The two deformation systems are also distanced apart so as not to interfere with one another in the movement.

The invention claimed is:

1. An apparatus for checking tyres, the apparatus comprising:
    a support on which a tyre is adapted to be rested, a resting wall and a free wall being defined in said tyre, said free wall being arranged at a certain height with respect to said support;
    a first deformation system configured to apply, through physical contact, a compression force on a surface of a first portion of said free wall, to elastically deform said free wall to form a first deformed portion of free wall;
    a first positioning actuator operatively associated with said first deformation system and configured to cause movement of said first deformation system towards and away from said surface of said first portion of free wall of said tyre, said movement having at least one component along a first axis parallel to a rotation axis of said tyre;
    a second deformation system configured to apply, through physical contact, a compression force on a surface of a second portion of said free wall, in order to elastically deform it so as to form a second deformed portion of free wall;
    a second positioning actuator operatively associated with said second deformation system and configured to cause movement of said second deformation system towards and away from said surface of said second portion of free wall of said tyre, said movement having at least one component along a second axis parallel to said rotation axis of said tyre; and
    a moving member to set said tyre in relative rotation about said rotation axis with respect to said first deformation system and said second deformation system,
        wherein a first plane passing through said rotation axis of said tyre and said first axis and a second plane passing through said rotation axis of said tyre and said second axis form an angle of 90° to 180°.

2. The apparatus for checking tyres according to claim 1, including
    a first light source adapted for emitting a light radiation to illuminate said surface of said first deformed portion and
    a first camera adapted for detecting an image of said surface of said first deformed portion and for generating at least one signal representative of the image detected.

3. The apparatus for checking tyres according to claim 2, including a first robotised arm adapted for moving said first light source and said first camera.

4. The apparatus for checking tyres according to claim 1, wherein said first positioning actuator is adapted for driving said first deformation system so that said first deformation system applies a constant force against said surface of said first portion of free wall or positions said surface of said first portion of free wall at a constant height with respect to said support.

5. The apparatus for checking tyres according to claim 1, wherein said second positioning actuator is adapted for driving said second deformation system so that said second deformation system applies a constant force against said surface of said second portion of free wall or positions said second portion of free wall at a constant height with respect to said support.

6. The apparatus according to claim 1, wherein
    said moving member is adapted for modifying the angular position of the surface of said first portion of free wall and said surface of said second portion of said free wall with respect to the rotation axis of the tyre and
    said apparatus includes a processing unit programmed to detect a value of output data at each angular position of the surface of said second portion of free wall as a function of a value of input data kept constant along at least one complete rotation of the surface of the second portion of free wall about said rotation axis, said output data corresponding to i) said force when said input data is the height of the surface of the second portion of free wall of said tyre at each angular position thereof, or to ii) said height when said input data is the force applied at each position of the surface of the second portion of free wall.

7. The apparatus according to claim 6,
    wherein said processing unit is programmed to
        detect a first value of output data at each position of the surface of said second portion of free wall as a function of a first value of input data kept substantially constant along at least one complete rotation of the surface of said second portion of free wall around said rotation axis, said output data corresponding to said force when said input data is the height of the surface of said second portion of free wall at each angular position, or to said height when said input data is the force applied at each position of the surface of said second portion of free wall, and detect a second value of the output data at each position of the surface of said second portion of free wall, said second value of the output data corresponding to a second value of the input data kept substantially constant along at least one complete rotation of the surface of said second portion of free wall around said rotation axis; and wherein said processing unit comprises a module programmed to calculate a relationship between said second value of the output data and said first value of the output data at each position of the surface of said second portion of free wall.

8. The apparatus according to claim 2, wherein said first light source is adapted for emitting a diffused light radiation to illuminate said surface of said first deformed portion, said surface being a surface belonging to a sidewall or to a shoulder of said tyre.

9. The apparatus according to claim 2, including a second light source adapted for emitting a light radiation to illuminate a further surface of said first deformed portion and a second camera adapted for detecting at least one further image of said further surface of said first deformed portion and for generating at least one signal representative of the further image detected.

10. The apparatus according to claim 9, including a first robotised arm adapted for moving said first light source and said first camera and including a second robotised arm adapted for moving said second light source and said second camera.

11. The apparatus according to claim 9, wherein said second light source is adapted for emitting a grazing light radiation to illuminate said further surface of said first deformed portion, said further surface being a surface belonging to an inner surface corresponding to a sidewall of said tyre.

12. The apparatus according to claim 9, including a third light source adapted for emitting a light radiation to illuminate said further surface of said first deformed portion, wherein said second camera is adapted for detecting at least one second further image of said further surface of said first deformed portion and for generating at least one signal representative of the second further image detected.

13. The apparatus according to claim 2, wherein said first camera defines an optical plane, said first light source illuminating said surface of said first deformed portion symmetrically with respect to said optical plane.

14. The apparatus according to claim 9, wherein said second camera defines an optical plane, said second light source illuminating said further surface of said first deformed portion symmetrically with respect to said optical plane.

15. The apparatus according to claim 9, including a reflective surface associated with said second camera and with said second light source, said reflective surface being adapted for reflecting a target line of said second camera by an angle of 60° to 120°.

16. The apparatus according to claim 15, wherein said reflective surface is arranged between said second light source and a third light source.

17. The apparatus according to claim 9, wherein said first camera and said second camera are linear cameras.

18. The apparatus according to claim 1, wherein said first deformation system includes a thrusting roller.

19. The apparatus according to claim 18, wherein the thrusting roller is freely rotatable about its own axis.

20. The apparatus according to claim 19, wherein said rotation axis of said thrusting roller is positionable at a predetermined angle with said rotation axis of said tyre.

21. The apparatus according to claim 9, further including a processing unit programmed to process said image and said further image, to detect possible defects in said surface and in said further surface of said tyre.

* * * * *